(12) United States Patent
Kang et al.

(10) Patent No.: US 11,726,530 B2
(45) Date of Patent: Aug. 15, 2023

(54) FOLDABLE ELECTRONIC DEVICE INCLUDING HINGE ASSEMBLY

(71) Applicant: Samsung Electronics Co., Ltd., Gyeonggi-do (KR)

(72) Inventors: Jaeho Kang, Gyeonggi-do (KR); Minsung Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 222 days.

(21) Appl. No.: 17/109,602

(22) Filed: Dec. 2, 2020

(65) Prior Publication Data
US 2021/0165466 A1 Jun. 3, 2021

(30) Foreign Application Priority Data
Dec. 2, 2019 (KR) ........................ 10-2019-0158437

(51) Int. Cl.
*E05D 11/10* (2006.01)
*E05D 3/06* (2006.01)
(Continued)

(52) U.S. Cl.
CPC ......... *G06F 1/1681* (2013.01); *H04B 1/3833* (2013.01); *H04M 1/0268* (2013.01)

(58) Field of Classification Search
CPC ...... G06F 1/168; G06F 1/1681; G06F 1/1616; G06F 1/547; E05Y 2900/602;
(Continued)

(56) References Cited

U.S. PATENT DOCUMENTS

| 9,848,502 B1 | 12/2017 | Chu et al. |
| 10,028,395 B2 | 6/2018 | Chen et al. |

(Continued)

FOREIGN PATENT DOCUMENTS

| EP | 3 109 847 | 12/2016 |
| EP | 3 407 581 | 11/2018 |

(Continued)

OTHER PUBLICATIONS

European Search Report dated Oct. 28, 2022 issued in counterpart application No. 22198185.5-1206, 6 pages.

(Continued)

*Primary Examiner* — Chuck Y Mah
(74) *Attorney, Agent, or Firm* — The Farrell Law Firm, P.C.

(57) ABSTRACT

An electronic device includes a first housing, a second housing, a hinge assembly rotatably coupling the first housing to the second housing, and a flexible display disposed on the first housing and the second housing across the hinge assembly. The hinge assembly includes a first bracket coupled to the first housing to rotate about a first axis, a second bracket coupled to the second housing to rotate about a second axis, a fixing bracket supporting the first bracket and the second bracket, a first shaft rotating about a third axis, a second shaft rotating adjacent to the first shaft and rotating about a fourth axis, a first arm coupled to the first shaft and having one side coupled to the first bracket, a second arm coupled to the second shaft and having one side coupled to the second bracket, and a support located between the first arm and the second arm.

17 Claims, 20 Drawing Sheets

(51) Int. Cl.
  *G06F 1/16* (2006.01)
  *H04B 1/3827* (2015.01)
  *H04M 1/02* (2006.01)

(58) Field of Classification Search
  CPC ......... E05Y 2900/606; E05Y 2800/205; E05Y 2800/20; E05Y 2800/242; H04M 1/022; H04M 1/0214; H04M 1/0216; H04M 1/0268; H04B 1/3833; E05D 3/12; E05D 3/122; E05D 3/14; E05D 3/16; E05D 3/06; E05D 11/06; E05D 1/00; E05D 1/02; E05D 1/04; E05D 7/00; F16C 11/12
  See application file for complete search history.

(56) References Cited

U.S. PATENT DOCUMENTS

| | | | |
|---|---|---|---|
| 10,036,188 B1* | 7/2018 | Yao | G06F 1/1681 |
| 10,310,551 B2 | 6/2019 | Bae et al. | |
| 10,401,917 B1 | 9/2019 | Dai et al. | |
| 10,480,225 B1* | 11/2019 | Hsu | E05D 3/12 |
| 10,912,214 B2 | 2/2021 | Kang et al. | |
| 10,931,070 B1* | 2/2021 | Files | H01R 24/40 |
| 2012/0243207 A1 | 9/2012 | Wang et al. | |
| 2013/0016492 A1* | 1/2013 | Wang | E05D 3/18 16/303 |
| 2018/0059740 A1 | 3/2018 | Kato | |
| 2018/0164855 A1 | 6/2018 | Tazbaz et al. | |
| 2019/0390703 A1* | 12/2019 | Hsu | F16C 11/04 |
| 2020/0097051 A1* | 3/2020 | Liu | G06F 1/1652 |
| 2020/0371553 A1* | 11/2020 | Hsu | G06F 1/1624 |
| 2020/0392983 A1* | 12/2020 | Chang | G06F 1/1681 |
| 2020/0401193 A1* | 12/2020 | Hsu | F16M 11/22 |
| 2020/0409429 A1* | 12/2020 | Hsu | G06F 1/1681 |
| 2021/0034116 A1 | 2/2021 | Torres et al. | |
| 2021/0067614 A1* | 3/2021 | Cheng | G06F 1/1681 |

FOREIGN PATENT DOCUMENTS

| | | |
|---|---|---|
| EP | 3 734 946 | 11/2020 |
| KR | 1020190097898 | 8/2019 |
| KR | 1020190124110 | 11/2019 |
| KR | 20200126524 | 11/2020 |

OTHER PUBLICATIONS

Indian Examination Report dated Nov. 22, 2022 issued in counterpart application No. 202217037710, 5 pages.
European Search Report dated Jul. 15, 2022 issued in counterpart application No. 20896206.8-1206, 8 pages.
International Search Report dated Apr. 7, 2021 issued in counterpart application No. PCT/KR2020/017443, 7 pages.

* cited by examiner

FOLDABLE ELECTRONIC DEVICE INCLUDING HINGE ASSEMBLY

CROSS-REFERENCE TO RELATED APPLICATION(S)

This application is based on and claims priority under 35 U.S.C. § 119 to Korean Patent Application No. 10-2019-0158437, filed on Dec. 2, 2019, in the Korean Intellectual Property Office, the disclosure of which is incorporated by reference herein in its entirety.

BACKGROUND

1. Field

The disclosure relates generally to a foldable electronic device including a hinge assembly.

2. Description of Related Art

With the development of digital technologies, electronic devices are provided in various forms, such as a smart phone, a tablet personal computer (PC), or a personal digital assistant (PDA). The electronic device is also developed such that it is portable or worn by a user to improve portability and user accessibility.

Recently, a portable electronic device such as a smart phone or a table PC, has been made lighter and thinner for ease of portability, and has been developed in various fields for convenience of use. In particular, despite that a foldable electronic device with a flexible display provides a relatively larger screen than a typical bar-type electronic device, portability can be improved since a size thereof is decreased when folded, thereby being satisfying consumers' preferences.

A foldable electronic device may include a flexible display and a plurality of housings. The plurality of housings and the flexible display may be coupled in a state of being supported by a hinge assembly, and may rotate the housing within a specified range according to a user's manipulation. The electronic device may be switched from a folded state to an unfolded state or from the unfolded state to the folded state through a process of rotating the plurality of housings.

There is a need to dispose various structures in order for the hinge assembly to rotate the housing. However, since a space to which the various structures can be disposed is narrow in a foldable electronic device with a narrow folding region, it may be difficult to dispose the various structures. Accordingly, there is a method that has been proposed to decrease a size of the hinge assembly by integrating the various structures. However, in the case of the aforementioned method, some regions of the flexible display may not be supported by the hinge assembly in a process in which the foldable electronic device is folded. Therefore, it is difficult to prevent some regions of the flexible display from being sagged or damaged.

SUMMARY

The present disclosure has been made to address the above-mentioned problems and disadvantages, and to provide at least the advantages described below.

According to an aspect of the disclosure, an electronic device includes a first housing, a second housing, a hinge assembly coupling the first housing and the second housing so that the second housing is rotatable with respect to the first housing, and a flexible display disposed from one region of the first housing to at least one region of the second housing across the hinge assembly. The hinge assembly includes a first bracket coupled to at least one region of the first housing to rotate about a virtual first rotation axis, a second bracket coupled to at least one region of the second housing to rotate about a virtual second rotation axis, a fixing bracket supporting the first bracket and the second bracket, a first shaft rotating about a third rotation axis different from the virtual first rotation axis, a second shaft adjacent to the first shaft to rotate about a fourth rotation axis different from the virtual second rotation axis, a first arm portion coupled to the first shaft to rotate about the third rotation axis, and having one side coupled to at least one region of the first bracket, a second arm portion coupled to the second shaft to rotate about the fourth rotation axis, and having one side coupled to at least one region of the second bracket, and a support portion located between the first arm portion and the second arm portion. The support portion supports at least one region of the flexible display when the electronic device is in an unfolded state, and may be spaced apart from the flexible display as the electronic device rotates from the unfolded state to a folded state.

According to another aspect of the disclosure, a hinge assembly includes a hinge housing, and at least one hinge structure disposed inside the hinge housing. The hinge structure includes a first bracket rotating about a virtual first rotation axis, a second bracket adjacent to the first bracket and rotating about a virtual second rotation axis different from the virtual first rotation axis, a fixing bracket supporting the first bracket and the second bracket, a first shaft rotating about a third rotation axis different from the virtual first rotation axis, and having a first gear coupled thereto, a second shaft adjacent to the first shaft to rotate about a fourth rotation axis different from the virtual second rotation axis, and having a second gear coupled thereto, a shaft bracket supporting the first shaft and the second shaft, a first idle gear gear-coupled with the first gear, a second idle gear gear-coupled with the first idle gear and the second gear, a first arm portion coupled to the first shaft to rotate about the third rotation axis, and having one side coupled to at least one region of the first bracket, a second arm portion coupled to the second shaft to rotate about the fourth rotation axis, and having one side coupled to at least one region of the second bracket, and a support portion moving up and down with the rotation of the first arm portion and second arm portion.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the disclosure provide an electronic device having a structure capable of supporting a flexible display even in a folding process to prevent some regions of the flexible display from being sagged or damaged in a process in which the foldable electronic device is folded.

Figure 1:
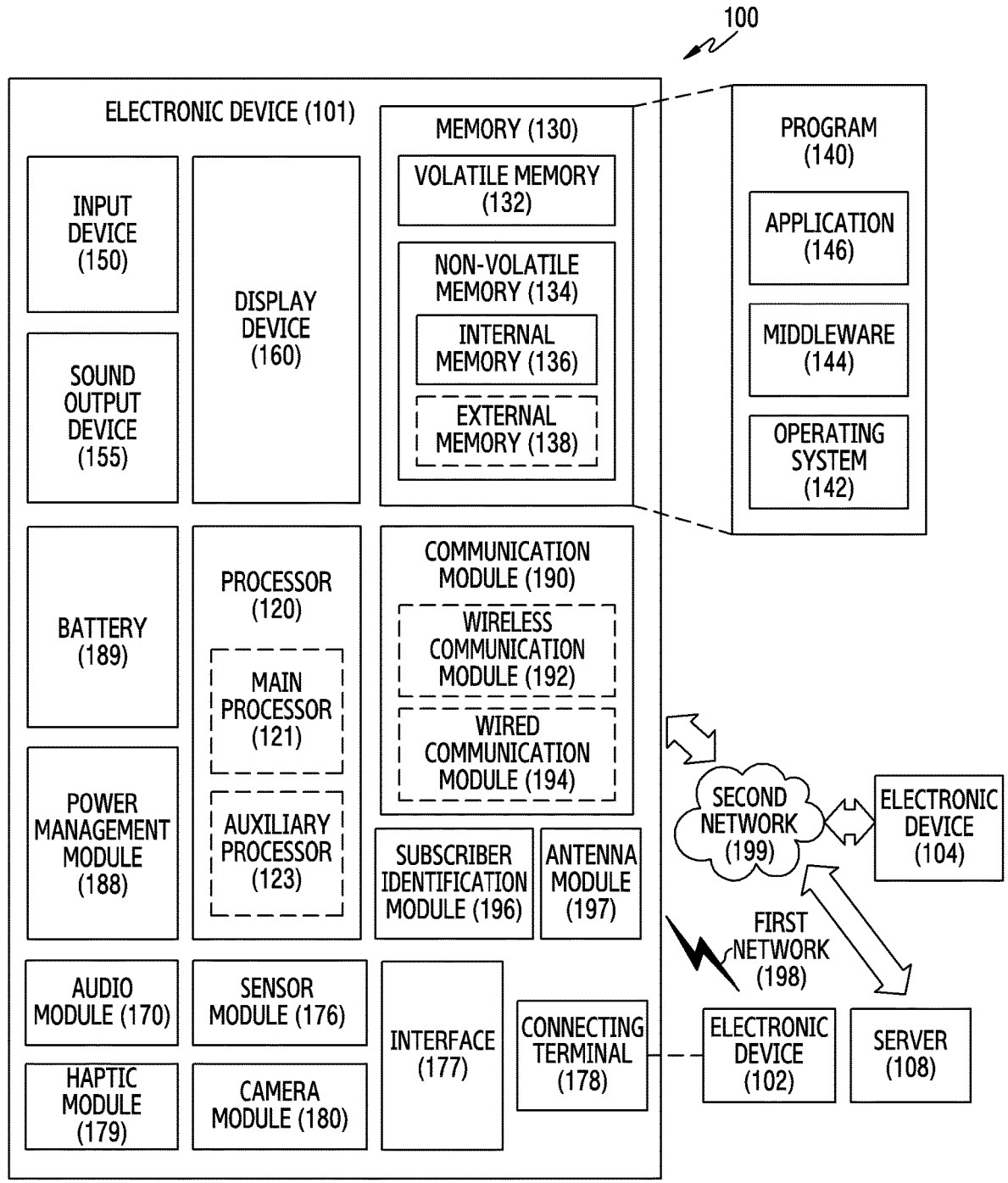
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108.

For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
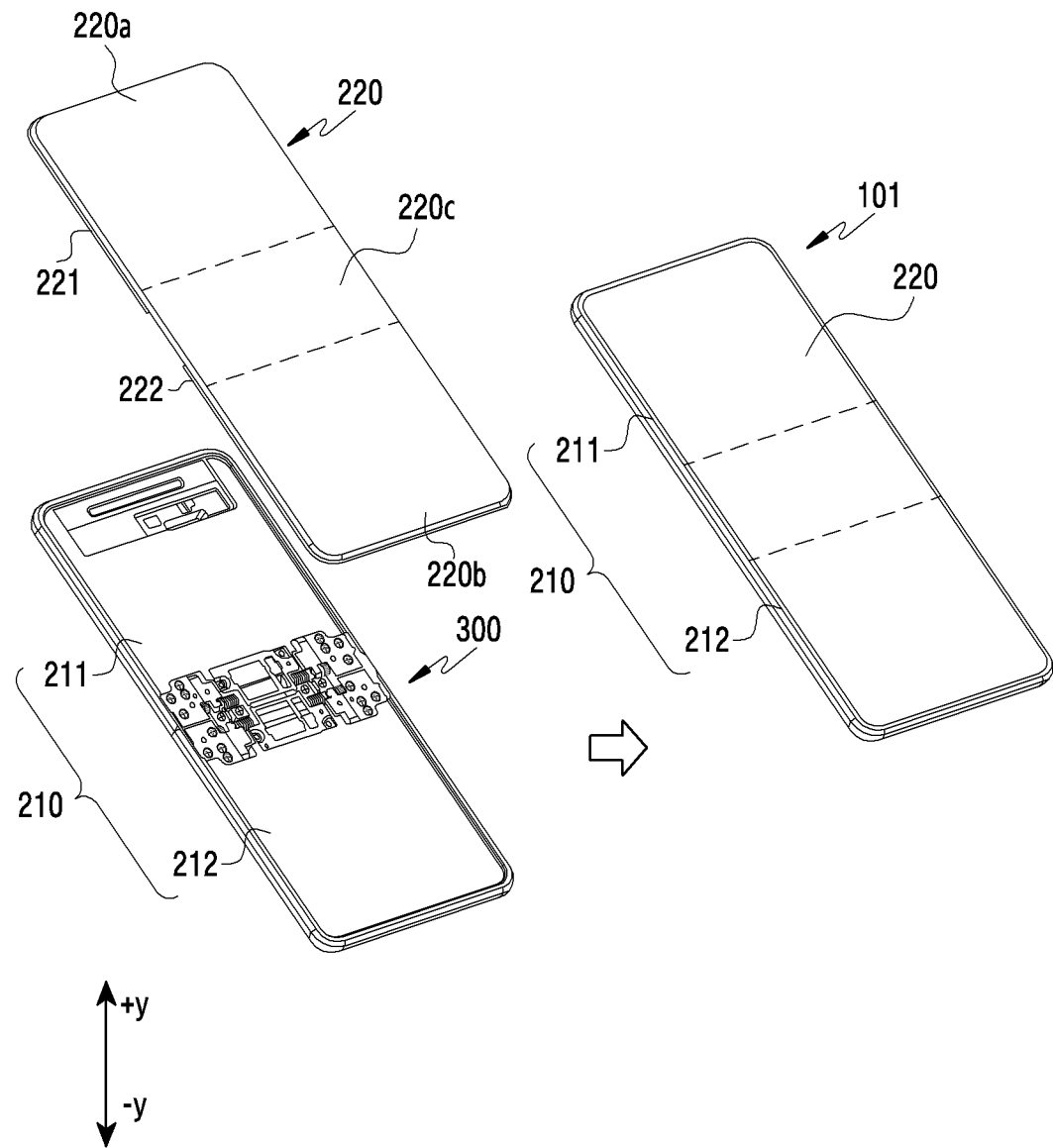
FIG. 2A is an exploded view of an electronic device in an unfolded state, according to an embodiment.
Figure 2B:
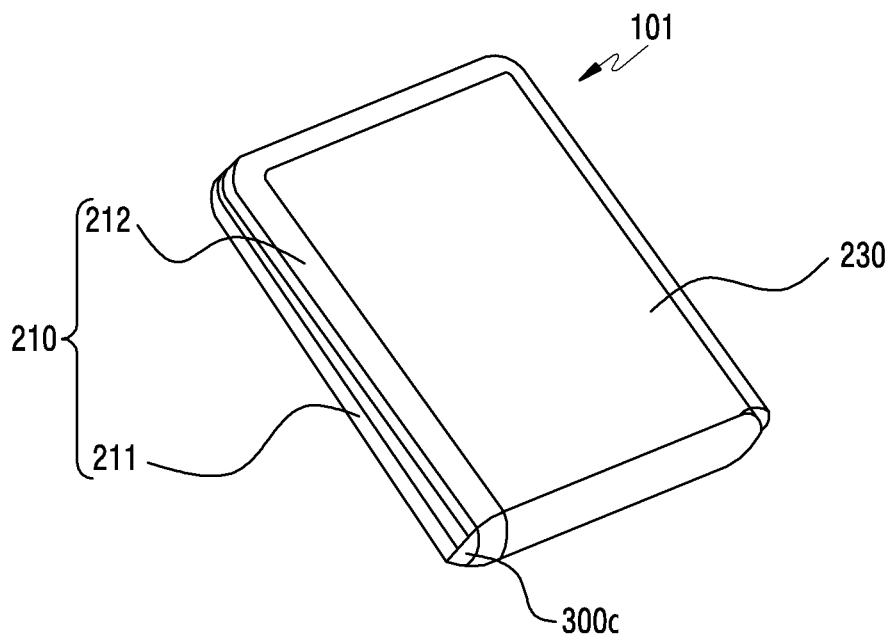
FIG. 2B illustrates a folded state of an electronic device, according to an embodiment.

FIG. 2A is an exploded view of an electronic device 101 in an unfolded state, according to an embodiment, and FIG. 2B illustrates a folded state of the electronic device 101, according to an embodiment.

Referring to FIG. 2A and FIG. 2B, the electronic device 101 includes a foldable housing 210 (a "housing") including a first housing 211 and a second housing 212, a flexible display 220, a hinge assembly 300, and a cover 230 (a "rear cover").

The first housing 211 and the second housing 212 may form a space in which electronic components (e.g., a PCB, a battery, or a processor) of the electronic device 101 can be disposed, and may form a side face of the electronic device 101. Various types of components for performing various functions of the electronic device 101 may be disposed inside the first housing 211 and the second housing 212. For example, electronic components such as a front camera, a receiver, or a sensor (e.g., a proximity sensor) may be disposed inside the first housing 211 and the second housing 212. The aforementioned electronic components may be exposed to a front face of the electronic device 101 through at least one opening or recess prepared on the flexible display 220.

The first housing 211 and the second housing 212 may be disposed in parallel to each other when the electronic device 101 is in an unfolded state. When the electronic device 101 is in the folded state, the first housing 211 may rotate (or turn) with respect to the second housing 212, so that one face of the first housing 211 faces one face of the second housing 212.

The first housing 211 and the second housing 212 may construct a recess for accommodating the flexible display 220, and the flexible display 220 may be supported by the first housing 211 and the second housing 212 by being mounted to the recess. The flexible display 220 may be supported by a first support plate 221 and/or a second support plate 222 located between the flexible display 220 and first housing 211 and the second housing 212, and details thereof will be described below. The first housing 211 and the second housing 212 may be constructed of a metal material and/or non-metal material having a specified rigidity to support the flexible display 220.

The flexible display 220 may be disposed on the first housing 211 and the second housing 212 to construct a front face (e.g., a face in the +y direction of FIG. 2A) of the electronic device 101 when the electronic device 101 is in the unfolded state. That is, the flexible display 220 may be disposed by extending up to at least one region of the second housing 212 across the hinge assembly 300 from one region of the first housing 211. The flexible display 220 may be disposed on the first housing 211 and the second housing 212 by being mounted to the recess constructed by the first housing 211 and the second housing 212.

The flexible display 220 may include a first region 220a corresponding to at least one region of the first housing 211, a second region 220b corresponding to at least one region of the second housing 212, and a folding region 220c located between the first region 220a and the second region 220b and having a flexible characteristic.

The first region 220a, the second region 220b, and the folding region 220c of the flexible display 220 may also be constructed to have the flexible characteristic. The first region 220a, the folding region 220c, and the second region 220b may be disposed in parallel to face the same direction (e.g., the +y direction of FIG. 2A), when the electronic device 101 is in the unfolded state. Alternatively, when the electronic device 101 is in the folded state, the folding region 220c may be bent such that the first region 220a and the second region 220b are disposed to face each other.

At least one of the first region 220a or the second region 220b of the flexible display 220 may be attached to a face of the first housing 211 and a face of the second housing 212. The flexible display 220 may be attached to a face of the first housing 211 and a face of the second housing 211 through the support plates 221 and 222 located between the flexible display 220 and the first housing 211 and second housing 212.

The support plates 221 and 222 may include the first support plate 221 attached to at least one region of the first housing 211 to support the first region 220a of the flexible display 220 and the second support plate 222 attached to at least one region of the second housing 212 to support the second region 220b of the flexible display 220. The first support plate 221 may be attached to at least one portion of the first region 220a of the flexible display 220 to support the flexible display 220. Similarly, the second support plate 222 may be attached to at least one portion of the second region 220b of the flexible display 220 to support the flexible display 220. The first support plate 221 and the second support plate 222 may be constructed of a material having a rigidity to support the flexible display 220.

The hinge assembly 300 may couple the first housing 211 and the second housing 212, and may rotate the second housing 212 about the first housing 211 within a specified rotation range, or on the contrary, may rotate the first housing 211 about the second housing 212 within a specified rotation range.

A recess may be constructed in a region where the first housing 211 and the second housing 212 are coupled, so that the hinge assembly 300 is disposed between the first housing 211 and the second housing 212. The aforementioned recess may be constructed in a shape of a groove having a specific coverture.

The hinge assembly 300 includes a hinge housing 300c. The hinge housing 300c may be visible to the outside of the electronic device 101 according to a state of the electronic device 101, or may be hidden by the foldable housing 210.

As shown in FIG. 2A, when the electronic device 101 is in the unfolded state, the hinge housing 300c is hidden by the folding housing 210, and thus may be invisible to the outside of the electronic device 101.

As shown in FIG. 2B, when the electronic device 101 is in the folded state, the hinge housing 300c may be visible to the outside of the electronic device 101 due to a rotation of the first housing 211 and second housing 212.

The cover 230 may be located at a lower end (e.g., the −y direction of FIG. 2A) of the first housing 211 and second housing 212 to construct a rear face of the electronic device 101. The cover 230 may include a first cover coupled to the first housing 211 and a second cover coupled to the second housing 212. The first cover and the first housing 211 may be constructed integrally, and the second cover and the second housing 212 may also be constructed integrally.

Figure 3:
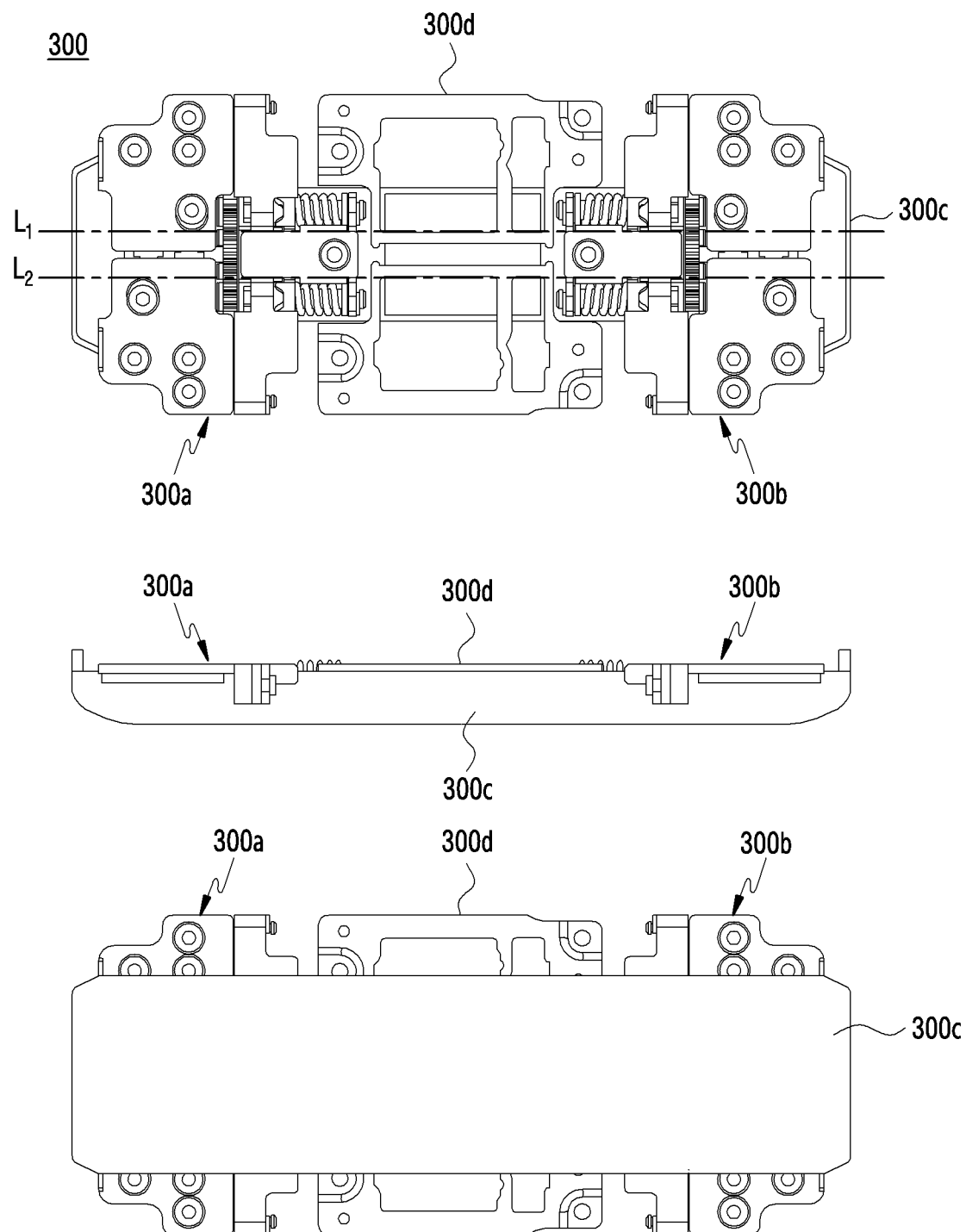
FIG. 3 illustrates a hinge assembly of an electronic device, according to an embodiment.

FIG. 3 illustrates a hinge assembly 300 of an electronic device, according to an embodiment.

Referring to FIG. 3, an electronic device 101 includes the hinge assembly 300. The hinge assembly 300 includes a hinge housing 300c and at least one or more hinge structures 300a and 300b disposed on the hinge housing 300c.

The hinge housing 300c may include a groove (or a recess) to which the at least one or more hinge structures 300a and 300b can be disposed. The at least one or more hinge structures 300a and 300b may be disposed inside the groove of the hinge assembly 300, and the at least one or more hinge structures 300a and 300b may be supported by the hinge housing 300c.

The hinge assembly 300 may include the first hinge structure 300a disposed to one region (e.g., a left region of FIG. 3) of the hinge housing 300c and the second hinge structure 300b disposed to another region (e.g., a right region of FIG. 3) of the hinge housing 300c. The first hinge structure 300a may be disposed to the left region of the hinge housing 300c, and thus may be coupled (or connected) to one region of a first housing 211 and second housing 212. The second hinge structure 300b may be disposed to the right region of the hinge housing 300c, and thus may be coupled (or connected) to the first housing and the second housing. The first hinge structure 300a and the second hinge structure 300b may rotate within a specified angle range about a virtual first rotation axis L1 constructed in the hinge housing 300c and a virtual second rotation axis L2 parallel to the virtual first rotation axis L1.

One region of the first hinge structure 300a and one region of the second hinge structure 300b may rotate about the first rotation axis L1, and another region of the first hinge structure 300a and another region of the second hinge structure 300b may rotate about the virtual second rotation axis L2. That is, the first hinge structure 300a and the second hinge structure 300b may be folded about the virtual first rotation axis L1 and second rotation axis L2, and details thereof will be described below. However, the hinge assembly 300 is not limited to the aforementioned embodiment, and the hinge assembly 300 may include three or more hinge structures (e.g., 300a and 300b).

The hinge assembly 300 may further include a hinge plate 300d disposed between the first hinge structure 300a and the second hinge structure 300b. The hinge plate 300d may be supported by the hinge housing 300, and the hinge plate 300d may support some regions of a flexible display 220. The hinge plate 300d may be constructed of a metal or non-metal material having a specified rigidity to support the flexible display.

Figure 4:
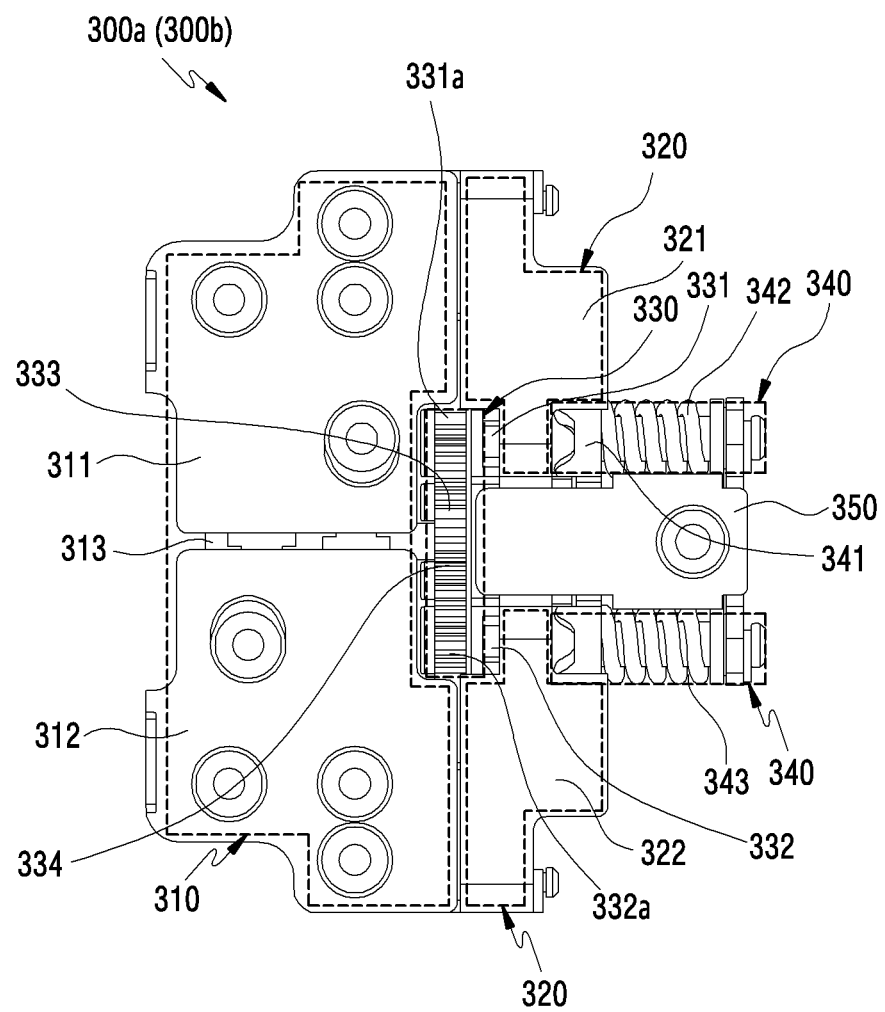
FIG. 4 illustrates a hinge structure constructing a hinge assembly of an electronic device, according to an embodiment.

FIG. 4 illustrates the first hinge structure 300a and the second hinge structure 300b constructing a hinge assembly of an electronic device, according to an embodiment.

Referring to FIG. 4, the first hinge structure 300a and the second hinge structure 300b includes a bracket structure 310, an arm structure 320, a rotation structure 330, a detent structure 340, and a support portion 350.

The bracket structure 310 includes a plurality of brackets 311 and 312 coupled with a first housing 211 and a second housing 212 and a fixing bracket 313 which supports the plurality of brackets 311 and 312. The plurality of brackets 311 and 312 coupled with the first housing 211 and the second housing 212 may rotate together with the first housing 211 and the second housing 212 in a process in which the electronic device 101 rotates from a folded state to an unfolded state or rotates from the unfolded state to the folded state.

The arm structure 320 includes an arm coupled to some components (e.g., a shaft) of the rotation structure 330 and rotatable within a specified range (e.g., 0° to 90° or 10° to 80°). The aforementioned arm may be coupled with one region of a bracket of the bracket structure 310 and thus may be slid with respect to the bracket in a rotation process of the electronic device, as described below.

The rotation structure 330 includes a plurality of shafts 331 and 332, a plurality of gears 331a and 332a coupled with the plurality of shafts 331 and 332, a plurality of idle gears 333 and 334 gear-coupled with the plurality of gears 331a and 332a, and a shaft bracket supporting the plurality of shafts. As the plurality of shafts 331 and 332, the plurality of gears 331a and 332a, and the plurality of idle gears 333 and 334 rotate in an engaged manner, the rotation structure 330 may allow the first housing 211 and the second housing 212 to rotate by the same rotation angle. Arm portions 321 and 322 of the arm structure 320 may be coupled to the shafts 331 and 332 of the rotation structure 330. Through the aforementioned structure, the arm portion may rotate about a rotation axis (or a turning axis) different from the brackets 311 and 312 of the bracket structure 310 by rotating the electronic device from the folded state to the unfolded state or from the unfolded state to the folded state.

The detent structure 340 includes a detent plate 341 having a detent portion constructed thereon, and a plurality of springs 342 and 343. The detent portion may be constructed to protrude from one region of the detent plate 341 facing the aforementioned arm portion. The detent portion may be constructed in a concavo-convex shape corresponding to a cam portion constructed in one region of the arm portions 321 and 322. The detent portion may be engaged with the cam portion of the arm portions 321 and 322 to fix a movement of the arm portions 321 and 322 when the electronic device is in the folded state. The plurality of springs 342 and 343 may be disposed between the detent plate 341 and the shaft bracket of the rotation structure 330 in a compressed state, so that the detent plate 341 is in contact with one region of the arm portions 321 and 322.

The support portion 350 is disposed to an empty space between the plurality of arm portions 321 and 322 and the plurality of shafts 331 and 332. The support portion 350 may move up and down (e.g., a movement in a direction from the +y axis to the −y axis or from the −y axis to the +axis of FIG. 2A) between the flexible display and the hinge housing 300c due to a rotation of the plurality of arm portions 321 and 322.

The support portion 350 may move in a direction of the flexible display due to the rotation of the plurality of arm portions in the process in which the electronic device rotates from the folded state to the unfolded state. As a result, the support portion 350 may be located to a rear face of the flexible display to support one region of the flexible display. The support portion 350 may be in contact with at least one region of the rear face of the flexible display to support the flexible display. The support portion 350 may be spaced apart by a minute distance from the flexible display to support one region of the flexible display. The first support plate 221 and/or the second support plate 222 may be attached to at least one region of the flexible display by an adhesive member (e.g., an adhesive). In the aforementioned case, the support portion 350 may support at least one region of the rear face of the first support plate 221 and/or the second support plate 222.

On the contrary, in the process in which the electronic device rotates from the unfolded state to the folded state, the support portion 350 may be spaced apart from the flexible display, and thus may not affect a driving trajectory of the flexible display.

Figure 5:
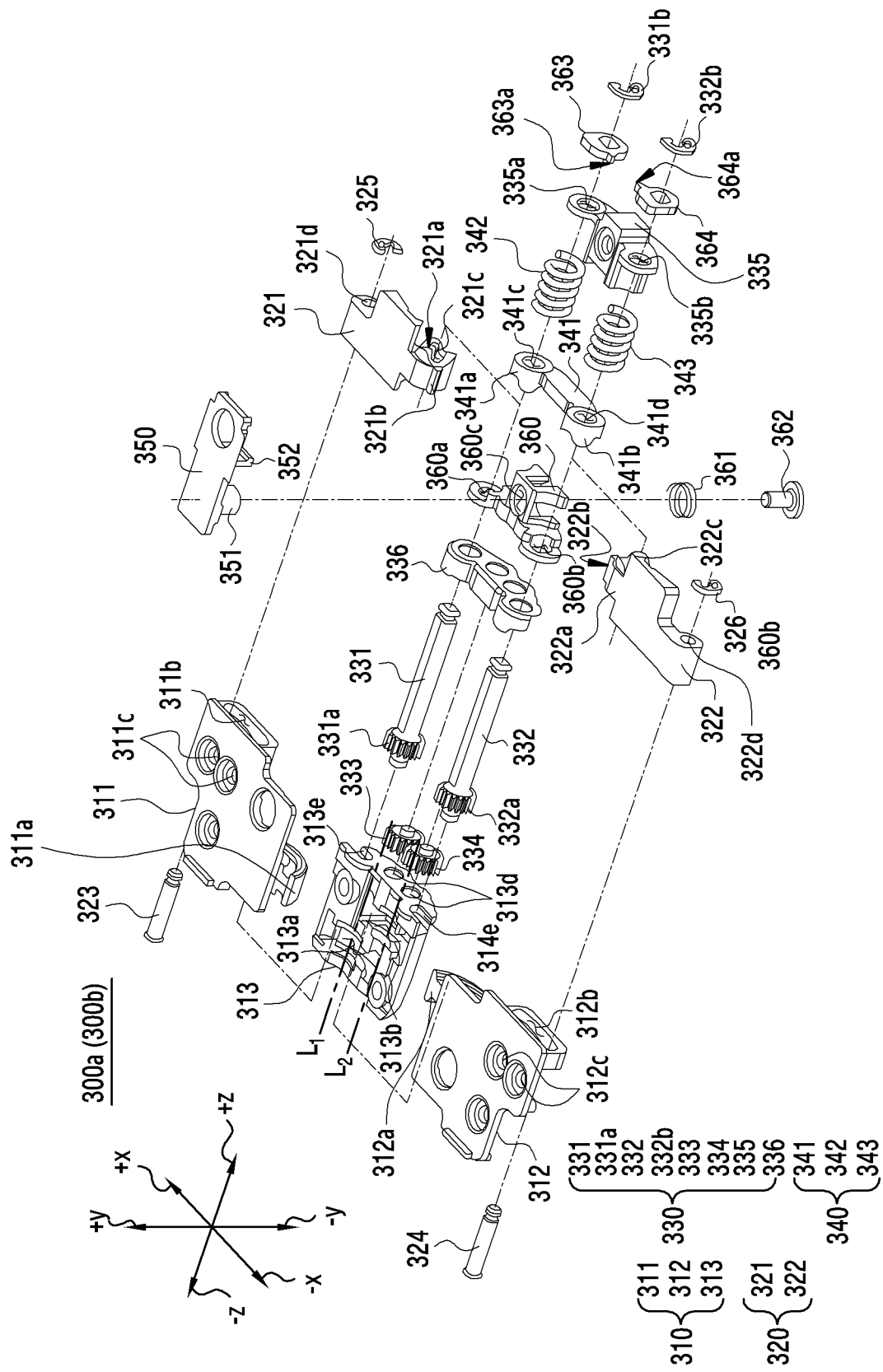
FIG. 5 is an exploded perspective view of the hinge structure of FIG. 4, according to an embodiment.

FIG. 5 is an exploded perspective view of the first hinge structure 300a and/or the second hinge structure 300b of FIG. 4, according to an embodiment.

Referring to FIG. 5, the hinge structure 300a and/or 300b includes a bracket structure 310, an arm structure 320, a rotation structure 330, a detent structure 340, a support portion 350, a stopper 360, an elastic member 361, and/or a screw 362. At least one of components of the first hinge structure 300a and/or the second hinge structure 300b of FIG. 5 may be identical or similar to at least one of components of FIG. 4, and redundant descriptions will be omitted hereinafter.

The bracket structure 310 includes a first bracket 311, a second bracket 312, and a fixing bracket 313.

The fixing bracket 313 may be disposed adjacent to a hinge housing 300c to support the first bracket 311 and the second bracket 312. A first groove 313a and a second groove 313b may be constructed in an upper face of the fixing bracket 313 (e.g., a face of the +y direction of FIG. 5), and the first bracket 311 and the second bracket 312 may be coupled to the fixing bracket 313 through the first groove 313a and the second groove 313b. The first groove 313a and the second groove 313b may be constructed in an arc shape having a specific curvature, the first bracket 311 may be coupled to the first groove 313a, and the second bracket 312 may be coupled to the second groove 313b.

Although the first groove 313a and the second groove 313b may be constructed in an arc shape having the same curvature, the first groove 313a and the second groove 313b may be constructed in arc shapes having different curvatures. The first groove 313a may be constructed in one region (e.g., a region of the +x direction of FIG. 5) of the fixing bracket 313 adjacent to the first bracket 311, and the second groove 313b may be constructed in another region (e.g., a region of the −x direction of FIG. 5) of the fixing bracket 313 adjacent to the second bracket 312. A plurality of gear holes 313d and a plurality of shaft holes 313e may be constructed in one side face (e.g., a face of the +z direction of FIG. 5) of the fixing bracket 313. A first idle gear 333 and a second idle gear 334, to be described below, may be fastened to a first shift 331 and a second shift 332 on one side face of the fixing bracket 313 through the aforementioned gear hole 313d and shaft hole 313e.

The first bracket 311 includes a first rail portion 311a, a first slide hole 311b, and a plurality of coupling holes 311c. The first rail portion 311a may be constructed to protrude in one region of the first bracket 311. The aforementioned first rail portion 311a may be constructed in a shape corresponding to the first groove 313a of the fixing bracket 313, and the first bracket 311 may be coupled to the first groove 313a of the fixing bracket 313 through the first rail portion 311a. The first slide hole 311b may be constructed in one region of the first bracket 311 adjacent to the first arm portion 321, and the first bracket 311 and the first arm portion 321 may be coupled through a first fixing portion 323 which passes through the first slide hole 311b and the first arm portion 321. The first fixing portion 323 may be slid inside the first slide hole 311b as the electronic device rotates from the folded state to the unfolded state or rotates from the unfolded state to the folded state, as described below.

The plurality of coupling holes 311c may be constructed in one face (e.g., a face of the +y direction of FIG. 5) facing a first housing 211 of the first bracket 311, and the first bracket 311 may be coupled to one region of the first housing through the plurality of coupling holes 311c. The first bracket 311 coupled to the first housing may be slid along the first groove 313a of the fixing bracket 313 with the rotation of the first housing, and may rotate about a virtual first rotation axis L1.

The second bracket 312 includes a second rail portion 312a, a second slide hole 312b, and a plurality of coupling holes 312c. The second rail portion 312a may be constructed to protrude in one region of the second bracket 312. The second rail portion 312a may be constructed in a shape corresponding to the second groove 313b of the fixing bracket 313, and the second bracket 312 may be coupled to the second groove 313b of the fixing bracket 313 through the second rail portion 312a. The second slide hole 312b may be constructed in one region of the second bracket 312 adjacent to the second arm portion 322, and the second bracket 312 and the second arm portion 322 may be coupled through a second fixing portion 324 which passes through the second slide hole 312b and the second arm portion 322. The second fixing portion 324 may be slid inside the second slide hole 312b as the electronic device rotates from the folded state to the unfolded state or rotates from the unfolded state to the folded state, as described below.

The plurality of coupling holes 312c may be constructed in one face (e.g., a face of the +y direction of FIG. 5) facing a second housing (e.g., the second housing 212 of FIG. 2A) of the second bracket 312, and the second bracket 312 may be coupled to one region of the second housing through the plurality of coupling holes 312c. The second bracket 312 coupled to the second housing may be slid along the second groove 313b of the fixing bracket 313 with the rotation of the second housing, and may rotate about a virtual second rotation axis L2. In this case, the virtual first rotation axis L1 and the virtual second rotation axis L2 are parallel, and may be constructed in a flat face parallel to the flexible display when the electronic device is in the folded state.

The arm structure 320 may include a first arm portion 321 and a second arm portion 322.

The first arm portion 321 may include a first cam portion 321a, a first support rib 321b, a first insertion hole 321c, and a first through-hole 321d. The first insertion hole 321c may be constructed in one region of a lower end (e.g., the −y direction of FIG. 5) of the first arm portion 321, and the first shaft 331 may be inserted to the first insertion hole 321c to couple the first arm portion 321 and the first shaft 331.

As the first arm portion 321 and the first shaft 331 are coupled, the first arm portion 321 may rotate about a rotation axis of the first shaft 331. The first cam portion 321a may be constructed in a region adjacent to the first insertion hole 321c, and may be constructed to protrude in a direction of the detent plate 341 (e.g., the +z direction of FIG. 5). The first cam portion 321a may be constructed in a concavo-convex shape in which a plurality of peaks and valleys are repeated, and the first cam portion 321a may be disposed to be engaged with the detent portion 341a constructed in the detent plate 341 to provide a sense of detent to the first arm portion 321.

In addition, since the first cam portion 321a may be disposed to be engaged with the detent portion 341a constructed in the detent plate 341, the first arm portion 321 may be fixed at a specified rotation angle and/or in a specified rotation angle range. As a result, a movement of the electronic device may be fixed at the specified rotation angle and/or in the specified rotation angle range (e.g., the range from 30° to 150°). The first support rib 321b may be constructed to protrude from one region of the first arm portion 321, and may move the support portion 350 in an upper direction (e.g., the +y direction of FIG. 5) when the electronic device rotates from the folded state to the unfolded state. The first through-hole 321d may be constructed in one region (e.g., a region of the +x direction of FIG. 5) in the opposite side of a region in which the first insertion hole 321c of the first arm portion 321 is constructed. The first fixing portion 323 passing through the first slide hole 311b may pass through the first through-hole 321d to couple the first bracket 311 and the first arm portion 321.

A first washer ring 325 may be fastened to one end of the first fixing portion passing through the first through-hole 321d, so that the first fixing portion 323 is fixed to the first arm portion 321. Alternatively, the first washer ring 325 may be fastened to the other end of the first fixing portion 323, so that the first fixing portion 323 is fixed to the first bracket 311. Additionally or alternatively, a protrusion may be constructed in one region of the first bracket 311 (or the first arm portion 321), and a coupling groove corresponding to the protrusion may be constructed in one region of the first arm portion 321 (or the first bracket 311), so that the first bracket 311 and the first arm portion 321 are coupled with the protrusion through the coupling groove. The first arm portion 321 coupled with the first bracket 311 may rotate about a rotation axis different from that of the first bracket 311 while sliding with respect to the first bracket 311, in the process in which the electronic device rotates from the folded state to the unfolded state or rotates from the unfolded state to the folded state.

The second arm portion 322 may include a second cam portion 322a, a second support rib 322b, a second insertion hole 322c, and a second through-hole 322d. The second insertion hole 322c may be constructed in one region of a lower end (e.g., the −y direction of FIG. 5) of the second arm portion 322, and the second shaft 332 may be inserted to the second insertion hole 322c to couple the second arm portion 322 and the second shaft 332. As the second arm portion 322 and the second shaft 332 are coupled, the second arm portion 322 may rotate about a rotation axis of the second shaft 332. The second cam portion 322a may be constructed in a region adjacent to the second insertion hole 322c, and may be constructed to protrude in a direction of the detent plate 341 (e.g., the +z direction of FIG. 5). Similarly to the first cam portion 321a, the second cam portion 322a may be constructed in a concavo-convex shape in which a plurality of peaks and valleys are repeated, and the second cam portion 322a may be disposed to be engaged with the detent portion 341b constructed in the detent plate 341 to provide a sense of detent to the second arm portion 322.

In addition, since the second cam portion 322a may be disposed to be engaged with the detent portion 341b constructed in the detent plate 341, the second arm portion 322 may be fixed at a specified rotation angle and/or in a specified rotation angle range. As a result, a movement of the electronic device may be fixed at the specified rotation angle and/or in the specified rotation angle range (e.g., the range from 30° to 150°). The second support rib 322b may be constructed to protrude from one region of the second arm portion 322, and may move the support portion 350 in an upper direction (e.g., the +y direction of FIG. 5) when the electronic device rotates from the folded state to the unfolded state. The second through-hole 322d may be constructed in a region in the opposite side of the second insertion hole 322c. The second fixing portion 324 passing through the second slide hole 312b may pass through the second through-hole 322d to couple the second bracket 312 and the second arm portion 322. A second washer ring 326 may be fastened to one end of the second fixing portion passing through the second through-hole 322d, so that the second fixing portion 324 is fixed to the second arm portion 322. Alternatively, the second washer ring 326 may be fastened to the other end of the second fixing portion 324, so that the second fixing portion 324 is fixed to the second bracket 312. Additionally or alternatively, a protrusion may be constructed in one region of the second bracket 312 (or the second arm portion 322), and a coupling groove corresponding to the protrusion may be constructed in one region of the second arm portion 322 (or the second bracket 312), so that the second bracket 312 and the second arm portion 322 are coupled with the protrusion through the coupling groove. The second arm portion 322 coupled with the second bracket 312 may rotate about a rotation axis different from that of the first bracket 312 while sliding with respect to the second bracket 312, in the process in which the electronic device rotates from the folded state to the unfolded state or rotates from the unfolded state to the folded state.

The rotation structure 330 includes the first shaft 331 coupled with a first gear 331a, the second shaft 332 coupled with a second gear 332a, the first idle gear 333, the second idle gear 334, a shaft bracket 335, and a gear cover 336.

One end of the first shaft 331 may be fastened to the shaft hole 313e of the fixing bracket 313, and the other end of the first shaft 331 may pass through a first shaft insertion hole 335a of the shaft bracket 335. The first arm portion 321 may be coupled to one region of the first shaft 331, and the first arm portion 321 may rotate about the first shaft 331 as the rotation axis.

The second shaft 332 may be disposed to a position adjacent to the first shaft 331. One end of the second shaft 332 may be fastened to the shaft hole 313e of the fixing bracket 313, and the other end of the second shaft 332 may pass through a second shaft insertion hole 335b of the shaft bracket 335. The second arm portion 322 may be coupled to one region of the second shaft 332, and the second arm portion 322 may rotate about the second shaft 332 as the rotation axis.

The first idle gear 333 and the second idle gear 334 may be disposed between the first gear 331a coupled to the first shaft 331 and the second gear 332a coupled to the second shaft 332. The first idle gear 333 and the second idle gear 334 may be fastened to the plurality of gear holes 313d of the fixing bracket 313, and the first idle gear 333 and the second idle gear 334 may rotate by being engaged with each other so that the first arm portion 321 and the second arm portion 322 rotate by the same rotation angle. The first idle gear 333 may rotate by being engaged with the first gear 331a and the second idle gear 334, and the second idle gear 334 may rotate by being engaged with the first idle gear 333 and the second gear 332a. As the aforementioned first gear 331, second gear 332a, first idle gear 333, and second idle gear 334 rotate by the same rotation angle by being engaged with one another, the first shaft 331 and the second shaft 332 may rotate by the same rotation angle in opposite directions. For example, when the first shaft 331 rotates by 30° counterclockwise (e.g., a direction from the +x axis to the +y axis of FIG. 5), the second shaft 332 may rotate by 30° clockwise (e.g., a direction from the −x axis to the +y axis of FIG. 5). As the first shaft 331 and the second shaft 332 rotate by the same rotation angle, the first arm portion 321 and second arm portion 322 coupled to the first shaft 331 and second shaft 332 may rotate by the same rotation angle.

The shaft bracket 335 may include the first shaft insertion hole 335a to which the first shaft 331 is inserted and the second shaft hole 335b to which the second shaft 332 is inserted. The shaft bracket 335 may be disposed inside a hinge housing 300c to support the first shaft 331 and second shaft 332 inserted to the shaft bracket 335 through the first shaft hole 335a and the second shaft hole 335b.

The gear cover 336 may be inserted to the first shaft 331 and the second shaft 332 to protect the first gear 331a, the second gear 332a, the first idle gear 333, and the second idle gear 334. The gear cover 336 may prevent the first gear 331a, the second gear 332a, the first idle gear 333, and the second idle gear 334 from being damaged by external force, and may prevent foreign matters from entering the first gear 331a, the second gear 332a, the first idle gear 333, and the second idle gear 334.

The detent structure 340 may include a detent plate 341, a first spring 342, and a second spring 343.

A third shaft insertion hole 341c to which the first shaft 331 is inserted may be constructed in one region of the detent plate 341, and a fourth shaft insertion hole 341d to which the second shaft 332 is inserted may be constructed in another region of the detent plate 341. The detent plate 341 may be coupled to the first shaft 331 and the second shaft 332 through the third shaft insertion hole 341c and the fourth shaft insertion hole 341d. The detent plate 341 may include a first detent portion 341a constructed to protrude in a direction of the first cam portion 321a of the first arm portion 321 and a second detent portion 341b constructed to protrude in a direction of the second cam portion 322a of the second arm portion 322. The first detent portion 341a and the second detent portion 341b may be constructed in a concavo-convex structure in which at least one peak and valley appear repeatedly. The first detent portion 341a may be disposed to be engaged with the first cam portion 321a, and thus, when the electronic device is in the folded state or the unfolded state, may provide a sense of detent to the first arm portion 321 and fix a movement of the first arm portion 321 at a specified rotation angle. Similarly, the second detent portion 341b may be disposed to be engaged with the second cam portion 322a and thus, when the electronic device is in the folded state or the unfolded state, may provide a sense of detent to the second arm portion 322 and fix a movement of the second arm portion at a specified rotation angle.

A pitch between a peak and another peak or between a valley and another valley of the first detent portion 341a may be greater than a pitch between a peak and another peak or between a valley and another valley of the first cam portion 321a, so that the first arm portion 321 is rotatable within a specified rotation range even in a state where the first detent portion 341a and the first cam portion 321a are engaged. However, a shape of the first detent portion 341a is not limited to the aforementioned embodiment. The pitch between the peaks or valleys of the first detent portion 341a may be constructed to be identical to the pitch between the peaks or valleys of the first cam portion 321a or the pitch between the peaks or valleys of the first cam portion 321a may be constructed to be greater than the pitch between the peaks or valleys of the first detent portion 341a.

Similarly, a pitch between a peak and another peak or between a valley and another valley of the second detent portion 341b may be greater than a pitch between a peak and another peak or between a valley and another valley of the second cam portion 322a, so that the second arm portion 322 is rotatable within a specified rotation range even in a state where the second detent portion 341b and the second cam portion 322a are engaged. However, a shape of the second detent portion 341b is not limited to the aforementioned embodiment. The pitch between the peaks or valleys of the second detent portion 341b may be constructed to be identical to the pitch between the peaks or valleys of the second cam portion 322a or the pitch between the peaks or valleys of the second cam portion 322a may be constructed to be greater than the pitch between the peaks or between the valleys of the second detent portion 341b.

The first spring 342 may be disposed to surround one region of the first shaft 331, and the second spring 343 may be disposed to surround one region of the second shaft 332. The first spring 342 and the second spring 343 may be disposed in a state of being compressed between the detent plate 341 and the shaft bracket 335, so that the detent plate 341 is closely in contact in a direction of the first arm portion 321 and the second arm portion 322. As the detent plate 341 is closely in contact in a direction of the first arm portion 321 and the second arm portion 322, it is possible to maintain a state where the first detent portion 341a and the first cam portion 321a are engaged and a state where the second detent portion 341b and the second cam portion 322a are engaged.

When the peak of the first detent portion 341a and the peak of the first cam portion 321a or the peak of the second detent portion 341b and the peak of the second cam portion 322a are in contact due to a rotation of the first arm portion 321 and the second arm portion 322, the detent plate 341 may move in one direction of the first shaft 331 and second shaft 332 (e.g., the +z direction of FIG. 5), so that the first cam portion 321a and the first detent portion 341a and/or the second cam portion 322a and the second detent portion 341b are temporarily spaced apart. As the detent plate 341 moves in one direction, the first spring 342 and the second spring 343 may be compressed. When the first arm portion 321 and the second arm portion 322 further rotate by a specific angle, the detent plate 341 may move again in a direction of the first cam portion 321a and/or the second cam portion 322a due to elastic restoration force of the first spring 342 and second spring 343. As a result, the first cam portion 321a and the first detent portion 341a may be disposed in a state of being engaged again with the second cam portion 322a and the second detent portion 341b, thereby maintaining a state where the first cam portion 321a and the first detent portion 341a are engaged and the second cam portion 322a and the second detent portion 341b are engaged.

A flat linear region may be constructed in at least one region (e.g., a summit region) of the peak of the first cam portion 321a, the peak of the second cam portion 322a, the peak of the first detent portion 341a, and/or the peak of the second detent portion 341b. Similarly, a flat linear region may also be constructed in at least one region of the valley of the first cam portion 321a, the valley of the second cam portion 322a, the valley of the first detent portion 341a, and/or the valley of the second detent portion 341b. The linear region constructed in one region of the peak and the linear region constructed in one region of the valley may be constructed to be substantially identical or similar. As the linear region is constructed in the peaks and valleys of the first cam portion 321, second cam portion 322a, first detent portion 341a, and second detent portion 341b, a movement of the first arm portion 321 and/or second arm portion 322 may be fixed at a specified rotation angle (e.g., 30° or 60°) and/or in a specified rotation angle range (e.g., a rotation angle range of 30° to 150°). As the movement of the first arm portion 321 and/or second arm portion 322 is fixed at the specified rotation angle, a movement of a first housing 211 and second housing 212 of the electronic device may be fixed at the specified rotation angle.

The support portion 350 may be disposed to form an empty space between the first arm portion 321 and the second arm portion 322 and the first shaft 331 and the second shaft 332. When the electronic device is in an unfolded state, the support portion 350 may support one region of a flexible display not supported by the first arm portion 321 and/or the second arm portion 322. The support portion 350 may move in an upper direction (e.g., the +y direction of FIG. 5) by means of the first arm rib 321b constructed in one region of the first arm portion 321 and the second support rib 322b constructed in one region of the second arm portion 322. In a process in which the electronic device rotates from the folded state to the unfolded state, the first support rib 321b and the second support rib 322b may be in contact with one region of the support portion 350, and the support portion 350 may move in an upper direction (e.g., in a direction from the −y axis to the +y axis of FIG. 5) by means of the first support rib 321b and the second support rib 322b with the rotation of the first arm portion 321 and the second arm portion 322.

The stopper 360 may be located at a lower end of the support portion 350 (e.g., the −y direction of FIG. 5). A fifth shaft insertion hole 360a may be constructed in one region of the stopper 360, and a sixth shaft insertion hole 360b may be constructed in one region in the opposite side of the fifth shaft insertion hole 360a. The first shaft 331 and the second shaft 332 may be inserted through the fifth shaft insertion hole 360a and the sixth shaft insertion hole 360b, and the first shaft 331, the second shaft 332, and the stopper 360 may be coupled through the aforementioned structure. A through-hole 360c may be constructed in one region of an upper end of the stopper 360 (e.g., the +y direction of FIG. 5), and a protrusion region 351 of the support portion 350 may be inserted in a lower direction of the stopper 360 by passing through the through-hole 360c.

The screw 362 may be coupled with the protrusion region 351 inserted to the lower end of the stopper 360, and the elastic member 361 may be disposed between the screw 362 and the stopper 360. The elastic member 361 may be a spring, but is not limited thereto. The elastic member 361 may be in contact with one region of the stopper 360, and the elastic member 361 may be compressed while the support portion 350 moves in an upper direction in a process in which the electronic device rotates from the folded state to the unfolded state. On the contrary, in a process in which the electronic device rotates from the unfolded state to the folded state, the support portion 350 may move in a lower direction (e.g., the −y direction of FIG. 5) due to elastic restoration force of the elastic member 361.

The first hinge structure 300a and/or the second hinge structure 300b may further include a first auxiliary member 363 and a second auxiliary member 364. The first auxiliary member 363 may be fastened to one end of the first shaft 331 adjacent to the shaft bracket 335, and the second auxiliary member 364 may be fastened to one end of the second shaft 332 adjacent to the shaft bracket 335. A third washer ring 331b may be fastened to one end of the first shaft 331, and thus the first shaft 331 may be fixed to the first auxiliary member 363. Similarly, a fourth washer ring 332b may be fastened to one end of the second shaft 332, and thus the second shaft 332 may be fixed to the second auxiliary member 364. A screw nut may be fastened to one end of the first shaft 331 so that the first shaft 331 is fixed to the first auxiliary member 363, and/or a screw nut may be fastened to one end of the second shaft 332 so that the second shaft 332 is fixed to the second auxiliary member 364.

The first auxiliary member 363 may include a third support rib 363a, and the third support rib 363a may be constructed to protrude from one region of the first auxiliary member 363. Similarly, the second auxiliary member 364 may include a fourth support rib 364a, and the fourth support rib 364a may be constructed to protrude from one region of the second auxiliary member 364. The first auxiliary member 363 may rotate by the same rotation angle as the first arm portion 321 through the first shaft 331, and the second auxiliary member 364 may rotate by the same rotation angle as the second arm portion 322 through the second shaft 332. When the electronic device rotates from the folded state to the unfolded state, the third support rib 363a and the fourth support rib 364a may allow the support portion 350 to move in an upper direction together with the first support rib 321b of the first arm portion 321 and the second support rib 322b of the second arm portion 322.

Figure 6A:
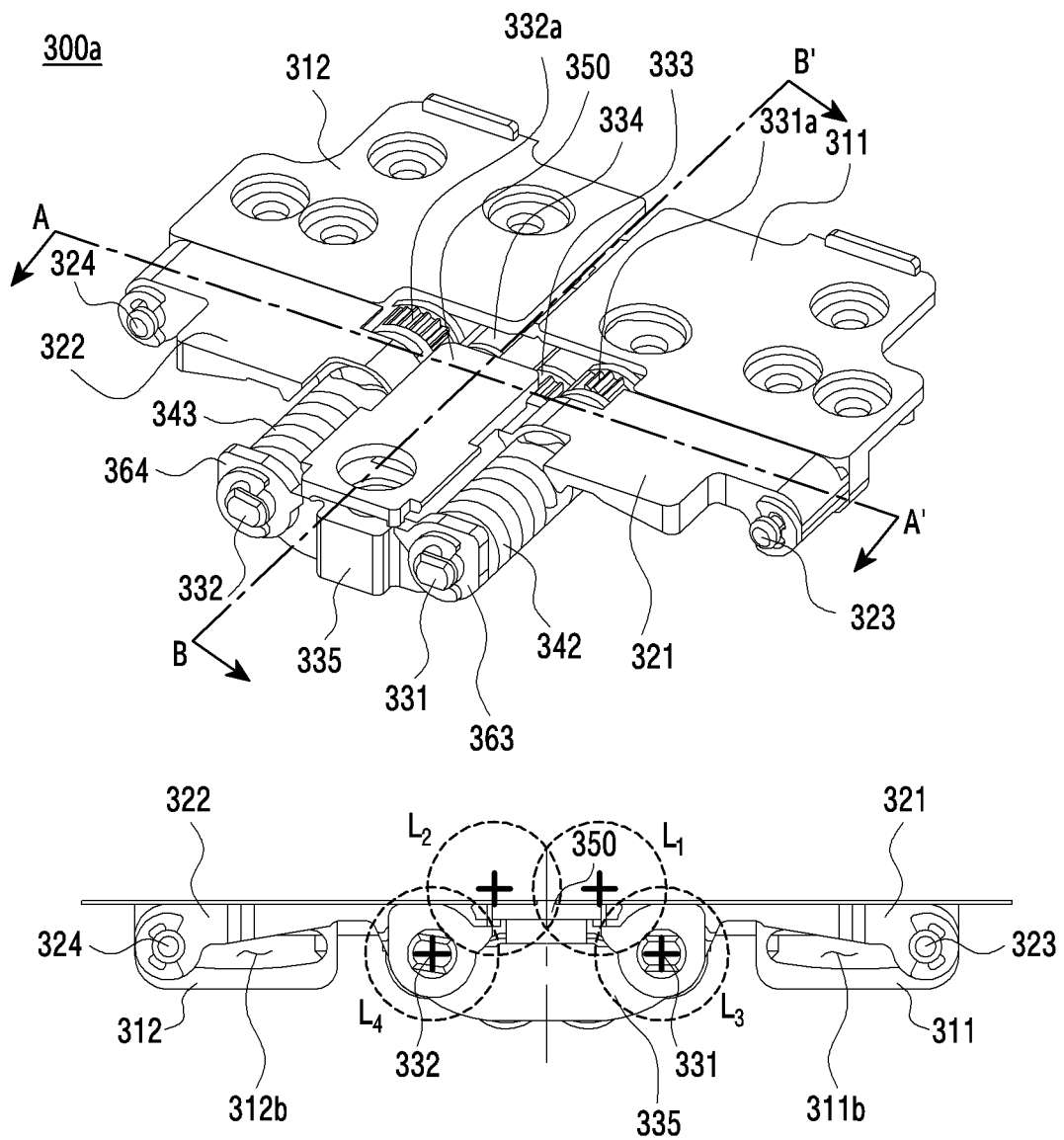
FIG. 6A illustrates a configuration of a hinge structure when an electronic device is in an unfolded state, according to an embodiment.
Figure 6B:
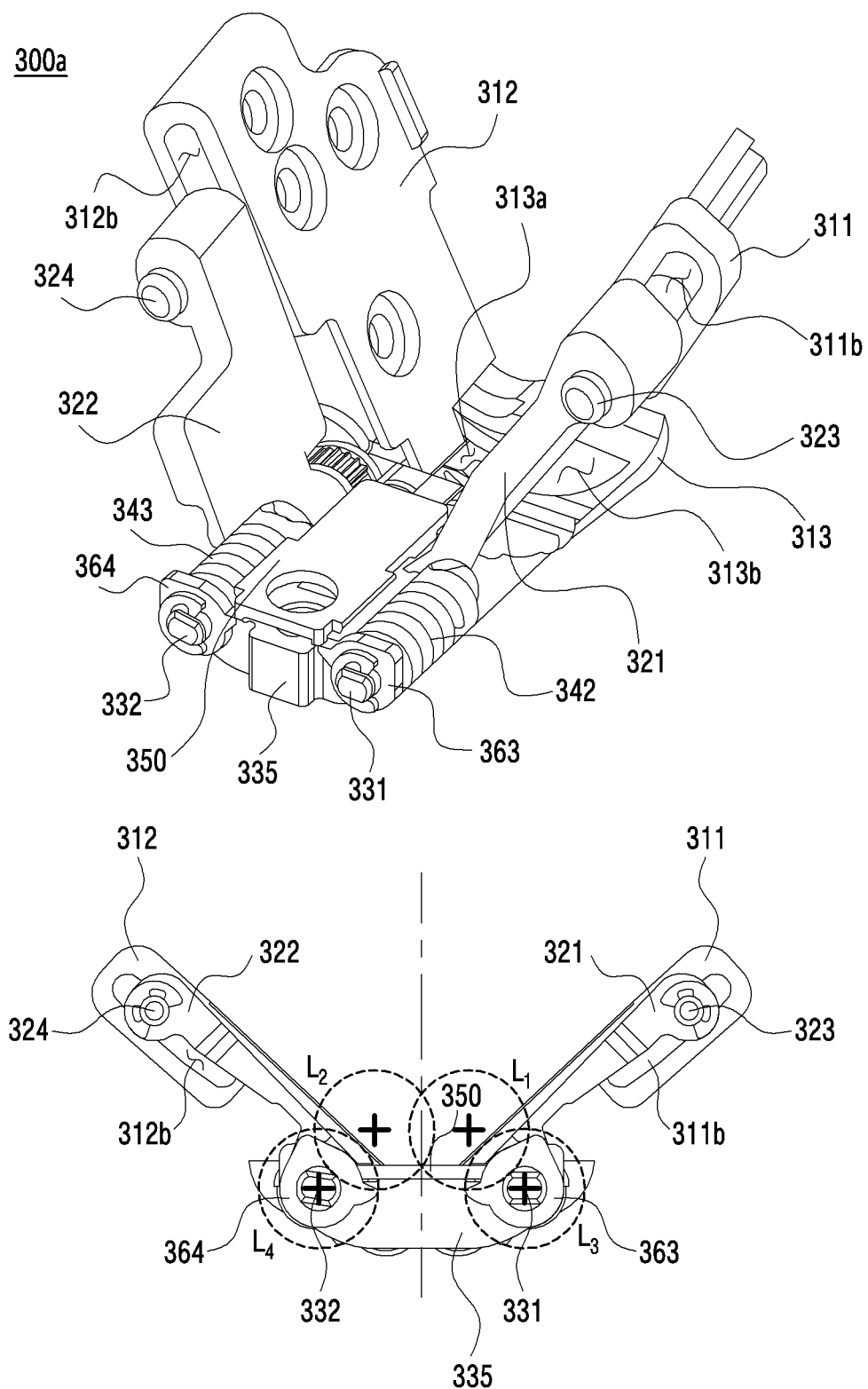
FIG. 6B illustrates a configuration of a hinge structure when an electronic device rotates from an unfolded state to a folded state, according to an embodiment.
Figure 6C:
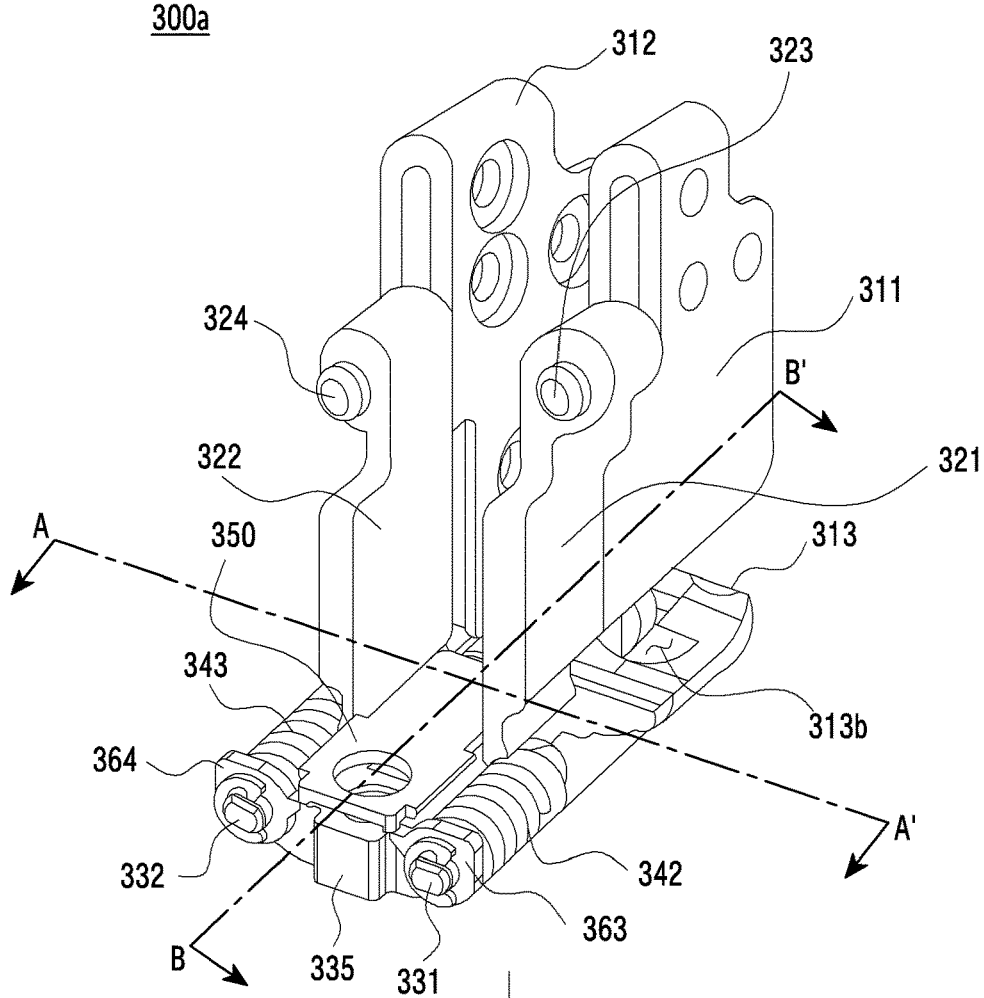
FIG. 6C illustrates a structure of a hinge structure when an electronic device is in a folded state, according to an embodiment.
Figure 6C:
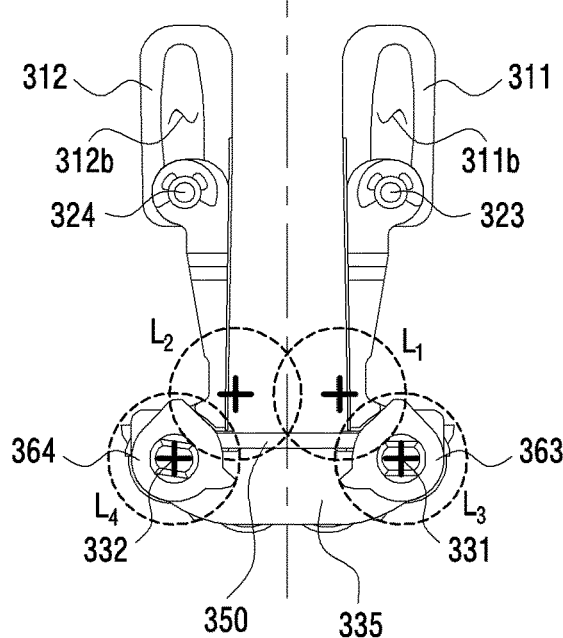

FIG. 6A illustrates a configuration of a hinge structure 300a when an electronic device is in an unfolded state, according to an embodiment. FIG. 6B illustrates a configuration of the hinge structure 300a when the electronic device rotates from the unfolded state to a folded state, according to an embodiment. FIG. 6C illustrates a structure of the hinge structure 300a when the electronic device is in the folded state, according to an embodiment.

A movement of a first arm portion 321, second arm portion 322, first bracket 311, and second bracket 312 due to a rotation of an electronic device will be described with reference to FIG. 6A to FIG. 6C.

Referring to FIG. 6A, FIG. 6B, and FIG. 6C, an electronic device 101 includes the hinge structure 300a. The hinge structure 300a may include the first bracket 311, the second bracket 312, a fixing bracket 313, the first arm portion 321, the second arm portion 322, a first fixing portion 323, a second fixing portion 324, a support portion 350, a first shaft 331 in which a first gear 331a and a first spring 342 are coupled, a second shaft 332 in which a second gear 332a and a second spring 343 are coupled, a first idle gear 333, a second idle gear 334, a shaft bracket 335, a first auxiliary member 363, and a second auxiliary member 364. At least one of components of the aforementioned hinge structure 300a may be identical or similar to at least one of components of FIGS. 3-5.

The first bracket 311 and the second bracket 312 may be mounted to a first groove 313a and a second groove 313b constructed in the fixing bracket 313 so as to be supported by the fixing bracket 313. The first bracket 311 may include a first rail portion 311a constructed in a shape corresponding to the first groove 313a, and the second bracket 312 may include a second rail portion 312a constructed in a shape corresponding to the second groove 313b. The first bracket 311 may rotate by sliding inside the first groove 313a through the first rail portion 311a, and the second bracket 312 may rotate by sliding inside the second groove 313b through the second rail portion 312a.

The first bracket 311 may be coupled to at least one region of a first housing 211 to rotate in association with the first housing. Similarly, the second bracket 312 may be coupled to at least one region of a second housing 212 to rotate in association with the second housing. Through the aforementioned structure, the first bracket 311 may rotate within a specified range about a virtual first rotation axis L1, and the second bracket 312 may rotate within a specified range about a virtual second rotation axis L2 adjacent to the first rotation axis L1. The first bracket 311 may rotate within an angle range from 0° to an angle (e.g., 90°) at which the electronic device is in the folded state with respect to the +x axis, and the second bracket 312 may rotate within an angle range from 180° to an angle at which the electronic device is in the folded state with respect to the +x axis. When the electronic device is in the unfolded state, the first bracket 311 and the second bracket 312 may be disposed to be horizontal to each other, and when the electronic device is in the folded state, the first bracket 311 and the second bracket 312 may be disposed to face each other.

The first arm portion 321 may be coupled to one region of the first shaft 331 to rotate together with the first shaft 331. The second arm portion 322 may be coupled to one region of the second shaft 332 adjacent to the first shaft 331 to rotate together with the second shaft 332. The first arm portion 321 may rotate about a rotation axis L3 (hereinafter, a "third rotation axis") of the first shaft 331 due to the aforementioned coupling structure. In addition, the second arm portion 322 may rotate about a rotation axis L4 (hereinafter, a "fourth rotation axis") of the second shaft 331. When the electronic device is in the unfolded state, the first arm portion 321 and the second arm portion 322 may be disposed to be horizontal to each other, and when the electronic device is in the folded state, the first arm portion 321 and the second arm portion 322 may be disposed to face each other.

The first arm portion 321 and the second arm portion 322 may rotate by the same angle through the first gear 331a of the first shaft 331, the second gear 332a of the second shaft 332, the first idle gear 333, and the second idle gear 334.

When the first shaft 331 rotates by a specific angle, the first gear 331a may also rotate by the same angle. The rotation of the first gear 331a may be transferred to the first idle gear 333 engaged with the first gear 331a, and the rotation transferred to the first idle gear 333 may be transferred to the second gear 332a through the second idle gear 334 engaged with the first idle gear 333. The second shaft 332 may also rotate by a specific angle due to the rotation transferred to the second gear 332a. Through the aforementioned process, the first arm portion 321 coupled with the first shaft 331 and the second arm portion 322 coupled with the second arm 332 may rotate by the same angle.

The first rotation axis L1 and the second rotation axis L2 may be constructed between the third rotation axis L3 and the fourth rotation axis L4. In addition, as the first rotation axis L1 and the second rotation axis L2 are constructed in an upper end region (e.g., the +y direction of FIG. 6A) of the third rotation axis L3 and fourth rotation axis L4, the first rotation axis L1 and the second rotation axis L2 may be constructed on a flexible display. That is, the first bracket 311, the second bracket 312, the first arm portion 321, and the second arm portion 322 may rotate within a specified angle range about rotation axes different from one another.

The first bracket 311 may be coupled with one region of the first arm portion 321 through the first fixing portion 323, and the second bracket 312 may be coupled with one region of the second arm portion 322 through the second fixing portion 324.

A first slide hole 311b may be constructed in one region adjacent to the first arm portion 321 of the first bracket 311, and the first fixing portion 323 may pass through the first slide hole 311b to couple the first bracket 311 and the first arm portion 321. Similarly, a second slide hole 312b may be constructed in one region adjacent to the second arm portion 322 of the second bracket 312, and the second fixing portion 324 may pass through the second slide hole 312b to couple the second bracket 312 and the second arm portion 322.

As the first bracket 311 rotates together with the first housing, the first fixing portion 323 may be slid inside the first slide hole 311b. Due to the sliding of the first fixing portion 323, the first arm portion 321 coupled with the first bracket 311 through the first fixing portion 323 may also be slid together. Similarly, due to the rotation of the second housing, the second fixing portion 324 may be slid inside the second slide hole 312b. Due to the sliding of the second fixing portion 324, the second arm portion 322 coupled with the second bracket 312 through the second fixing portion 324 may also be slid together.

Referring to FIG. 6A, when the electronic device in which the first bracket 311, the second bracket 312, the first arm portion 321, and the second arm portion 322 are disposed on the same plane is in the unfolded state, the first fixing portion 323 may be disposed outside the first slide hole 311b, and the second fixing portion 324 may be disposed outside the second slide hole 312b.

Referring to FIG. 6B, in a process in which the electronic device rotates from the unfolded state to the folded state, the first housing and the second housing may rotate by a first angle (e.g., 30° with respect to the +x axis or the −x axis) by a user's manipulation or external force. As the first housing and the second housing rotate, the first bracket 311 and the second bracket 312 coupled to the first housing and the second housing may also rotate by the first angle.

In a process in which the first bracket 311 rotates counterclockwise (e.g., in a direction from the +x axis to the +y axis of FIG. 6B), the first fixing portion 323 may be slid by a specific distance in an inward direction from the outside of the first slide hole 311b. The first arm portion 321 may rotate counterclockwise by a second angle greater than the first angle due to the sliding of the first fixing portion 323. Similarly, the second arm portion 322 may rotate by the second angle clockwise due to the sliding of the second fixing portion 324.

Referring to FIG. 6C, when the electronic device is in the folded state, the first bracket 311 and the first arm portion 321, and the second bracket 312 and the second arm portion 322, may respectively be disposed to face each other in one face. The first bracket 311, the second bracket 312, the first arm portion 321, and the second arm portion 322 may be disposed to be substantially vertical to the +x axis or to have an angle (e.g., 800 to 100°) at which the electronic device is in the folded state. When the electronic device is in the folded state, the first fixing portion 323 may be disposed inside the first slide hole 311b, and the second fixing portion 324 may also be disposed inside the second slide hole 312b.

That is, the first fixing portion 323 may be slid in an inward direction from the outside of the first slide hole 311b in the process in which the electronic device rotates from the unfolded state to the folded state, and on the contrary, may be slid in an outward direction from the inside of the first slide hole 311b in the process in which the electronic device rotates from the folded state to the unfolded state. In this case, the second fixing portion 324 may be slid in the same manner as the first fixing portion 323.

In a process in which the first bracket 311 and the second bracket 312 rotate about the virtual first rotation axis L1 and second rotation axis L2 by a user's manipulation or external force, the first fixing portion 323 and the second fixing portion 324 may be respectively slid inside the first slide hole 311b and the second slide hole 312b. Due to the sliding of the first fixing portion 323 and second fixing portion 324, the first arm portion 321 and the second arm portion 322 may rotate about the third rotation axis L3 and the fourth rotation axis L4. As a result, the first arm portion 321 may rotate about a rotation axis (e.g., L3) different from the first bracket 311 due to the rotation of the first bracket 311. Similarly, the second arm portion 322 may rotate about a rotation axis (e.g., L4) different from the second bracket 312 due to the rotation of the second bracket 312.

Figure 7:
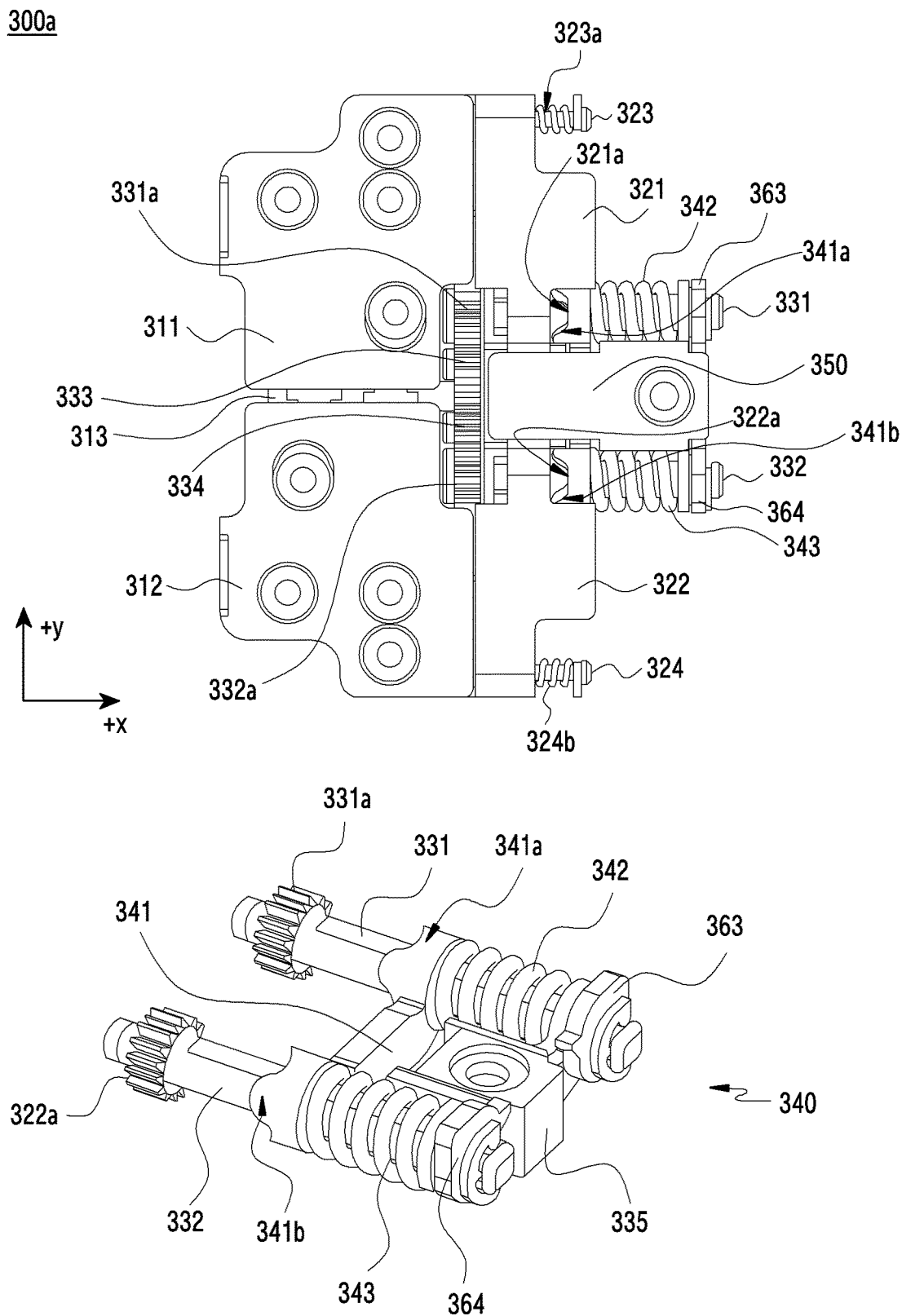
FIG. 7 illustrates elements of a fixing portion and a detent structure of a hinge structure, according to an embodiment.

FIG. 7 illustrates elements of a first fixing portion 323 or a second fixing portion 324, and a detent structure 340 of a hinge structure 300a, according to an embodiment. Hereinafter, elements of the first fixing portion 323, the second fixing portion 324, the first coupling arm portion 321, the second coupling arm portion 322, the first bracket 311, the second bracket 312, and the detent structure 340 will be described with reference to FIG. 7.

Referring to FIG. 7, the hinge structure 300a of an electronic device 101 includes the first bracket 311, the second bracket 312, a fixing bracket 313, the first arm portion 321, the second arm portion 322, the first fixing portion 323, the second fixing portion 324, a first shaft 331 to which a first gear 331a is coupled, a second shaft 332 to which a second gear 332a is coupled, a first idle gear 333, a second idle gear 334, the detent structure 340, a support portion 350, a first auxiliary member 363, and a second auxiliary member 364. At least one of components of the hinge structure 300a of FIG. 7 may be identical or similar to at least one of components of FIG. 5, and redundant descriptions will be omitted hereinafter.

The first bracket 311 and the first arm portion 321 may be coupled through the first fixing portion 323 which passes through one region of the first bracket 311 and first arm portion 321. The second bracket 312 and the second arm portion 322 may be coupled through the second fixing portion 324 which passes through one region of the second bracket 312 and second arm portion 322. The first fixing portion 323 and the second fixing portion 324 may be constructed in a pin shape which extends in a longitudinal direction (e.g., the +x direction of FIG. 7).

The hinge structure 300a may further include a first elastic body 323a and a second elastic body 324a. The first elastic body 323a and the second elastic body 324a may be a spring or a disk spring, but are not limited thereto.

The first elastic body 323a may be disposed along an outer circumferential surface of the first fixing portion 323, and may be disposed in a compressed state between the first arm portion 321 and a first washer ring 325. Some regions of the first elastic body 323a may pass through some regions of the first arm portion 321, and may be disposed between the first arm portion 321 and the first washer ring 325. As the first elastic body 323a is disposed in a compressed state between the first arm portion 321 and the first washer ring 325, a frictional force may be generated between the first arm portion 321 and the first bracket 311. A torque may be generated in a direction opposite to a rotation direction of the first arm portion 321 due to the frictional force generated between the first arm portion 321 and the first bracket 311, and a movement of the first arm portion 321 may be fixed due to the generated torque. That is, the hinge structure 300a may fix the movement of the first arm portion 321 in a free stop manner in the process in which the electronic device rotates from the folded state to the unfolded state or rotates from the unfolded state to the folded state without a separate additional component by using the first elastic body 323a.

The second elastic body 324a may be disposed to an outer circumferential surface of the second fixing portion 324, and may be disposed in a compressed state between the second arm portion 322 and a second washer ring 326. Some regions of the second elastic body 324a may pass through some regions of the second arm portion 322, and may be disposed between the second arm portion 322 and the second washer ring 326. As the second elastic body 324a is disposed in a compressed state between the second arm portion 322 and the second washer ring 326, a frictional force may be generated between the second arm portion 322 and the second bracket 312. A torque may be generated in a direction opposite to a rotation direction of the second arm portion 322 due to the frictional force generated between the second arm portion 322 and the second bracket 312, and the movement of the second arm portion 322 may be fixed due to the generated torque. That is, the hinge structure 300a may fix a movement of the second arm portion 322 in the process in which the electronic device rotates from the folded state to the unfolded state or rotates from the unfolded state to the folded state without a separate additional component by using the second elastic body 324a.

The detent structure 340 of the hinge structure 300a may include the detent plate 341, a first spring 342, and a second spring 343.

A shaft insertion hole (e.g., the third shaft insertion hole 341c and/or fourth shaft insertion hole 341d) may be constructed in at least one region of the detent plate 341, so that the first shaft 331 and the second shaft 332 are coupled to the detent plate 341. Additionally or alternatively, a diameter of the shaft insertion hole may be constructed to be greater than a diameter of the second shaft 332, so that the first shaft 331 and the second shaft 332 can freely rotate in a state of being coupled with the detent plate 341. The detent plate 341 may include a first detent portion 341a constructed to protrude along a longitudinal direction of the first shaft 331 and a second detent portion 341b constructed to protrude along a longitudinal direction of the second shaft 332. The first detent portion 341a may be disposed to be engaged with a first cam portion 321a of the first arm portion 321, and the second detent portion 341b may be disposed to be engaged with a second cam portion 322a of the second arm portion 322, so that the first arm portion 321 and the second arm portion 322 can provide a sense of detent to the first arm portion 321 and the second arm portion 322.

The first spring 342 may be coupled with the first shaft 331 so as to be located between the detent plate 341 and a shaft bracket 335 supporting the first shaft 331. The second spring 343 may be coupled with the second shaft 332 adjacent to the first shaft 331, so as to be located between the detent plate 341 and the shaft bracket 335 supporting the second shaft 332.

The first spring 342 and the second spring 343 may be disposed in a compressed state to the shaft bracket 335 and the detent plate 341, and pressure may be applied to the shaft bracket 335 in a direction opposite to the detent plate 341 due to elastic restoration force of the first spring 342 and second spring 343. Due to the elastic restoration force of the first spring 342 and second spring 343, the first detent portion 341a and second detent portion 341b of the detent plate 341 may maintain a state of being engaged with the first cam portion 321a of the first arm portion 321 and the second cam portion 322a of the second arm portion 322. With the rotation of the first arm portion 321 and second arm portion 322, the detent plate 341 may be temporarily spaced apart in a direction of the shaft bracket 335. The first spring 342 and the second spring 343 may be compressed due to the detent plate 341 being spaced apart. Due to elastic restoration force of the compressed first spring 342 and second spring 343, the detent plate 341 may move again in a direction of the first arm portion 321 and the second arm portion 322.

That is, even if the detent plate 341 is temporarily spaced apart from the first arm portion 321 and the second arm portion 322, the detent plate 341 may be in contact again with the first arm portion 321 and the second arm portion 322 by means of the first spring 342 and the second spring 343. The detent structure 340 may maintain an engagement state between the first detent portion 341a and the first cam portion 321a and between the second detent portion 341b and the second cam portion 322a through the aforementioned structure.

Figure 8:
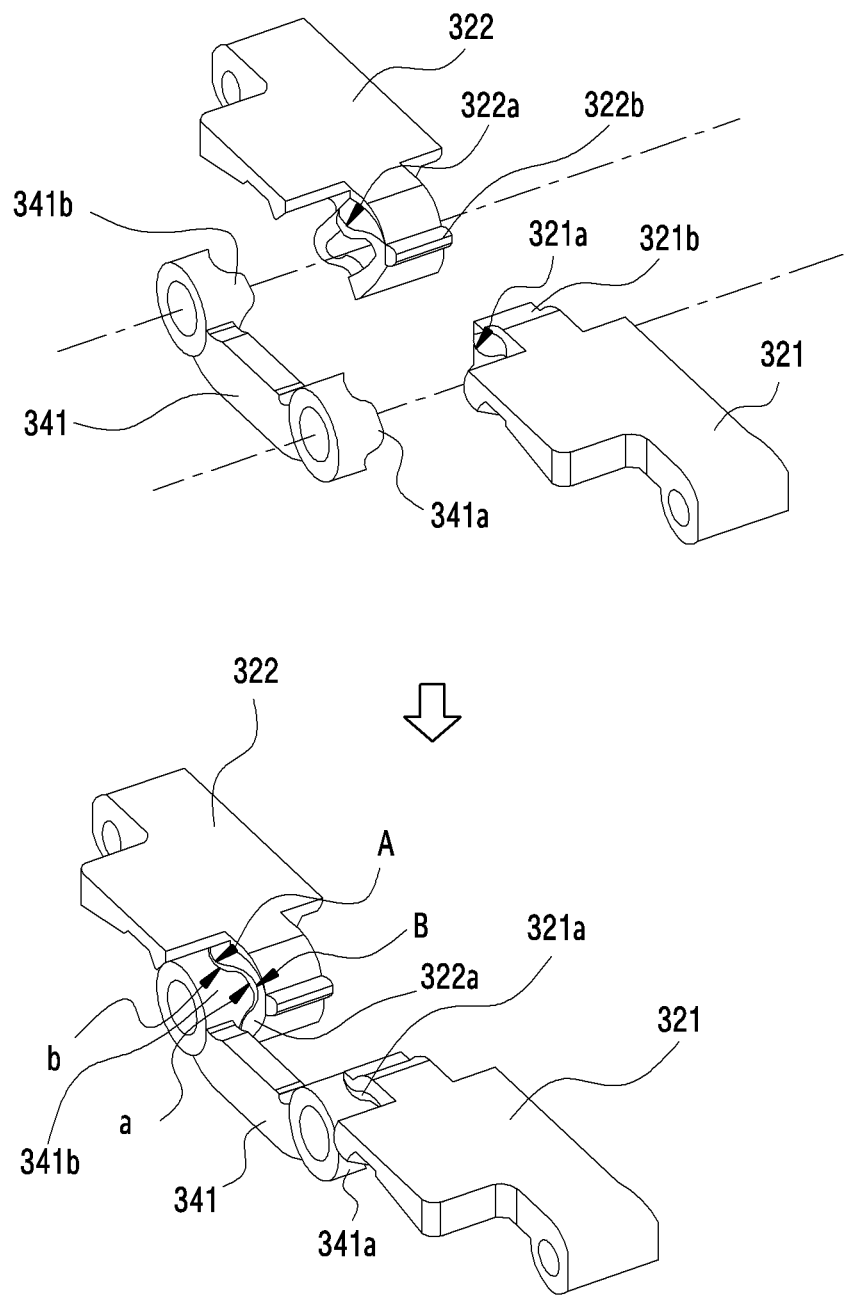
FIG. 8 illustrates a coupling relationship between elements of an arm structure and a detent structure of a hinge structure, according to an embodiment.

FIG. 8 illustrates a coupling relationship between some elements of a first arm structure 321 and/or a second arm structure 322 and a detent structure 341 of a hinge structure 300a, according to an embodiment.

Referring to FIG. 8, a hinge structure 300a and/or 300b of an electronic device 101 includes the first arm portion 321, the second arm portion 322, and the detent plate 341.

The first arm portion 321 may include a first cam portion 321a and a first support rib 321b, and the second arm portion 322 may include a second cam portion 322a and a second support rib 322b. The first support rib 321b of the first arm portion 321 and the second support rib 322b of the second arm portion 322 may allow a support portion 350 to move in an upper direction.

The first cam portion 321a of the first arm portion 321 and the second cam portion 322a of the second arm portion 322 may be constructed in a concavo-convex structure in which a peak (e.g., A of FIG. 8) and a valley (e.g., B of FIG. 8) appear repeatedly. The first arm portion 321 and the second arm portion 322 may be coupled with the detent plate 341, and thus may be disposed such that the first cam portion 321a is engaged with a first detent portion 341a, and the second cam portion 322a is engaged with a second detent portion 341b.

The detent plate 341 may include the first detent portion 341a constructed to protrude in a direction of the first cam portion 321a of the first arm portion 321 and the second detent portion 341b constructed to protrude in a direction of the second cam portion 322a of the second arm portion 322. The first detent portion 341a and the second detent portion 341b may be constructed in a concavo-convex structure in which a peak (e.g., a of FIG. 8) and a valley (e.g., b of FIG. 8) appear repeatedly. The peak and valley of the first detent portion 341a may be constructed in a shape corresponding to the peak and valley of the first cam portion 321a, and the peak and valley of the second detent portion 341b may be constructed in a shape corresponding to the peak and valley of the second cam portion 322a. The peak (e.g., a of FIG. 8) of the first detent portion 341a and the valley (e.g., B of FIG. 8) of the first cam portion 321a may be disposed to correspond to each other, and the valley (e.g., b of FIG. 8) of the first detent portion 341a and the peak (e.g., A of FIG. 8) of the first cam portion 321a may be disposed to correspond to each other, so that the first detent portion 341a and the first cam portion 321a are engaged with each other. Similarly, the peak of the second detent portion 341b and the valley of the second cam portion 322a may be disposed to correspond to each other, and the valley of the second detent portion 341b and the peak of the second cam portion 322a may be disposed to correspond to each other, so that the second detent portion 341b and the second cam portion 322a are engaged with each other.

As it is disposed such that the first cam portion 321a and the first detent portion 341a are engaged and the second cam portion 322a and the second detent portion 341b are engaged, the detent plate 341 may provide a sense of detent to the first arm portion 321 and the second arm portion 322. A pitch between a peak and peak (or valley and valley) of the first detent portion 341a may be constructed to be longer than a pitch between a peak and peak (or valley and valley) of the first cam portion 321a, so that the first cam portion 321a rotates within a specified angle range even if it is in a state of being engaged with the first detent portion 341a. Additionally or alternatively, the pitch between the peak and peak (or valley and valley) of the first detent portion 341a may be constructed to be equal to the pitch between the peak and peak (or valley and valley) of the first cam portion 321a or may be constructed to be shorter than the pitch between the peak and peak (or valley and valley) of the first cam portion 321a. In a process in which the electronic device rotates from a folded state to an unfolded state or rotates from the unfolded state to the folded state, there may be case where the peak of the first cam portion 321a of the first arm portion 321 is engaged with the peak of the first detent portion 341a so that the first arm portion 321 and the detent plate 341 are temporarily spaced apart. In a process in which the peak of the first cam portion 321a is beyond the peak of the first detent portion 341a, the first detent portion 341a may provide a sense of detent to the first arm portion 321. Additionally or alternatively, the second detent portion 341b may also provide a sense of detent to the second arm portion 322 in the same or similar manner as the first detent portion 341a.

The first detent portion 341a and the second detent portion 341b may not only provide the sense of detent to the first arm portion 321 and the second arm portion 322 but also fix a movement of the first arm portion 321 and second arm portion 322.

A flat linear region may be constructed in at least one region (e.g., a summit region) of the peak of the first cam portion 321a, the peak of the second cam portion 322a, the peak of the first detent portion 341a, and/or the peak of the second detent portion 341b. Similarly, a flat linear region may also be constructed in at least one region of the valley of the first cam portion 321a, the valley of the second cam portion 322a, the valley of the first detent portion 341a, and/or the valley of the second detent portion 341b. The linear region constructed in one region of the peak and the linear region constructed in one region of the valley may be constructed to be substantially identical or similar. As described above, as the linear region is constructed in the peaks and valleys of the first cam portion 321, second cam portion 322a, first detent portion 341a, and second detent portion 341b, the movement of the first arm portion 321 and/or second arm portion 322 may be fixed at a specified rotation angle (e.g., 30° or 60°). As the movement of the first arm portion 321 and/or second arm portion 322 is fixed at the specified rotation angle, a movement of a first housing 211 and second housing 212 of the electronic device may be fixed at the specified rotation angle.

Figure 9:
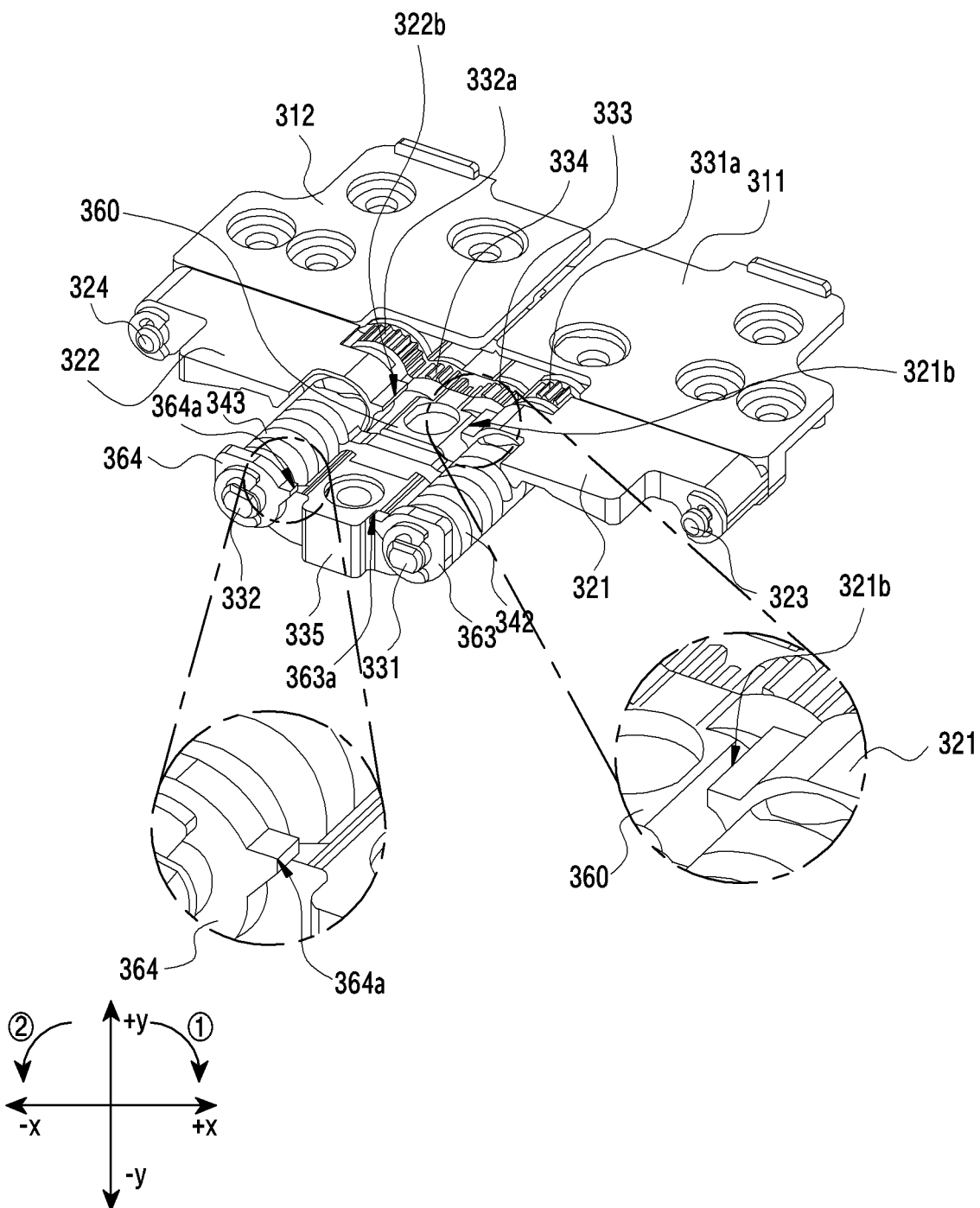
FIG. 9 is an enlarged view illustrating elements of a hinge structure, according to an embodiment.

FIG. 9 is an enlarged view illustrating elements of a hinge structure 300a, according to an embodiment. The hinge structure 300a of FIG. 9 illustrates a state where a support portion 350 is removed.

Referring to FIG. 9, the hinge structure 300a of an electronic device 101 includes a first bracket 311, a second bracket 312, a first arm portion 321, a second arm portion 322, a first fixing portion 323, a second fixing portion 324, a first shaft 331 to which a first gear 331a is coupled, a second shaft 332 to which a second gear 332a is coupled, a first idle gear 333, a second idle gear 334, a shaft bracket 335, a first spring 342, a second spring 343, a stopper 360, a first auxiliary member 363, and a second auxiliary member 364. At least one component of the hinge structure 300a of FIG. 9 may be identical or similar to at least one of component of FIG. 5, and redundant descriptions will be omitted hereinafter.

The first arm portion 321 may include a first support rib 321b, and the second arm portion 322 may include a second support rib 322b. The first support rib 321b may be constructed to protrude from one region of the first arm portion 321. In addition, the second support rib 322b may be constructed to protrude from one region of the second arm portion 322. When the electronic device is in an unfolded state, the first support rib 321b may be constructed to protrude in a direction of the stopper 360 located between the first arm portion 321 and the second arm portion 322 from the first arm portion 321. Similarly, the second support rib 322b may be constructed to protrude in a direction of the stopper 360 from the second arm portion 322.

The first support rib 321b may be constructed integrally with the first arm portion 321, and may rotate along with a rotation of the first arm portion 321. In addition, the second support rib 322b may be constructed integrally with the second arm portion 322, and may rotate along with a rotation of the second arm portion 322. As the first support rib 321b and the second support rib 322b rotate together with the first arm portion 321 and the second arm portion 322, a support portion 350 disposed on the stopper 360 may move in an upper direction (e.g., the +y direction of FIG. 9). In a process in which the electronic device rotates from the folded state to the unfolded state, at least one region of the first support rib 321b and second support rib 322b may be in contact with one region of the support portion (e.g., a rear face of the support portion 350).

According to an embodiment, as the first arm portion 321 rotates clockwise (e.g., the direction ① of FIG. 9), the first support rib 312b may move the support portion 350 in an upper direction. On the other hand, as the second arm portion 322 rotates counterclockwise (e.g., the direction ② of FIG. 9), the second support rib 322b may move the support portion 350 in an upper direction.

The first auxiliary member 363 may be coupled to one end of the first shaft 331 adjacent to the first arm portion 321, and the second auxiliary member 364 may be coupled to one end of the second shaft 332 of the second arm portion 322. The first auxiliary member 363 may be coupled to the first shaft 331 to rotate together with the first shaft 331. The second auxiliary member 364 may be coupled to the second shaft 332 to rotate together with the second shaft 332.

The first auxiliary member 363 may include a third support rib 363a constructed to protrude from one region of the first auxiliary member 363. In addition, the second auxiliary member 364 may include a fourth support rib 364a constructed to protrude from one region of the second auxiliary member 364. The third support rib 363a may be disposed at a position parallel to the first support rib 321b of the first arm 321, and the fourth support rib 364a may be disposed at a position parallel to the second support rib 322b of the second arm portion 322. The third support rib 363a may be spaced apart from the first support rib 321b to rotate by the same rotation angle as the first support rib 321b with the rotation of the first shaft 331. The fourth support rib 364a may be spaced apart from the second support rib 322b to rotate by the same rotation angle as the second support rib 322b with the rotation of the second shaft 332.

The third support rib 363a and the fourth support rib 364a may move the support portion in an upper direction in the process in which the electronic device rotates from the folded state to the unfolded state, similarly to the first support rib 321b and the second support rib 322b. The third support rib 363a and the fourth support rib 364a may be in contact with one region of the support portion in the process in which the electronic device rotates from the folded state to the unfolded state. As the first shaft 331 rotates clockwise (e.g., the direction ① of FIG. 9), the third support rib 363a may move the support portion in an upper direction. Otherwise, as the second shaft 332 rotates counterclockwise (e.g., the direction ② of FIG. 9), the fourth support rib 364a may move the support portion in an upper direction.

That is, the hinge structure 300a may move the support portion in an upper direction in the process in which the electronic device rotates from the folded state to the unfolded state through the first support rib 321b, the second support rib 322b, the third support rib 363a, and the fourth support rib 364a. Accordingly, the support portion can be in contact with a rear face of a flexible display 220, thereby preventing the flexible display from being sagged and/or damaged when the electronic device is in the unfolded state.

Figure 10A:
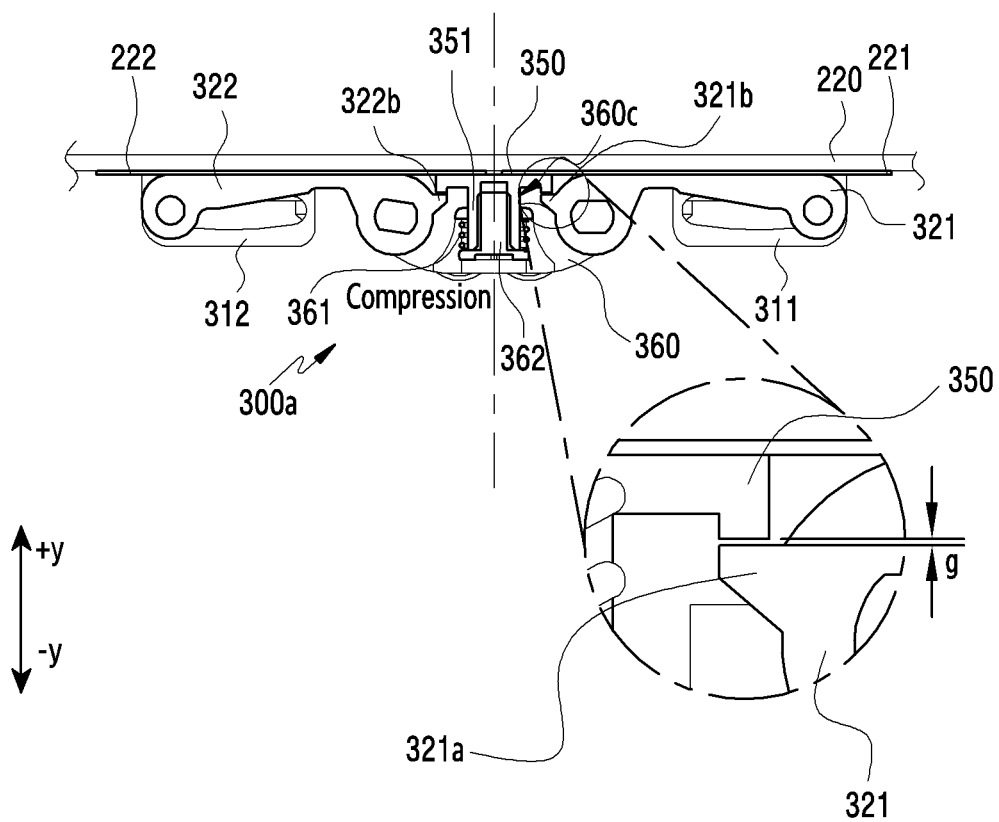
FIG. 10A is a cross-sectional view of a hinge structure when an electronic device is in an unfolded state, according to an embodiment.
Figure 10B:
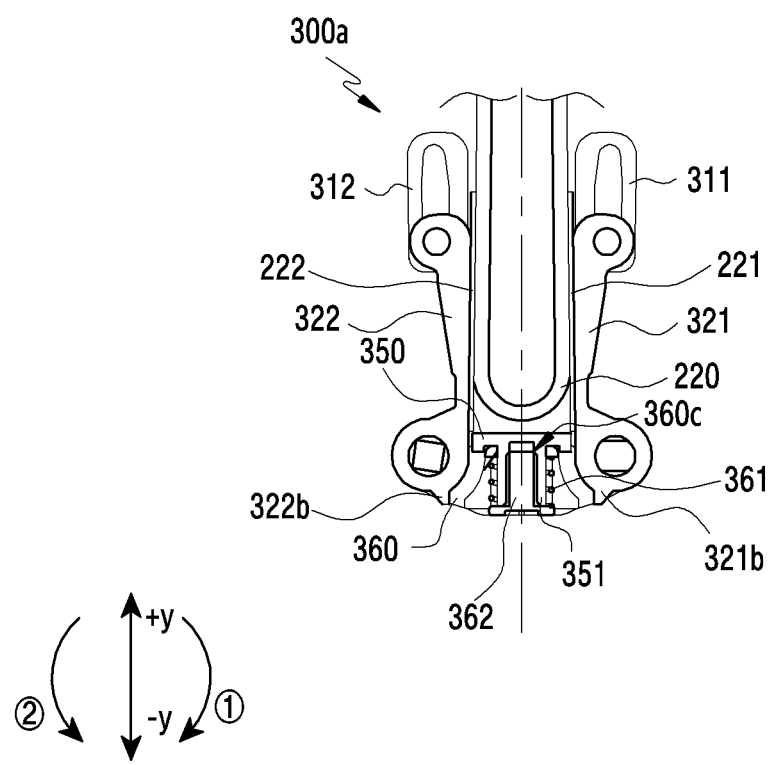
FIG. 10B is a cross-sectional view of a hinge structure when an electronic device is in a folded state, according to an embodiment.

FIG. 10A is a cross-sectional view of a hinge structure 300a when an electronic device is in an unfolded state, according to an embodiment. FIG. 10B is a cross-sectional view of the hinge structure 300a when the electronic device is in a folded state, according to an embodiment. FIG. 10A may illustrate a cross-section of the hinge structure 300a of FIG. 6A, cut along the direction A-A', and FIG. 10B may illustrate a cross-section of the hinge structure 300a of FIG. 6C, cut along the direction A-A'.

Referring to FIG. 10A and FIG. 10B, an electronic device includes a flexible display 220, a first support plate 221 supporting the flexible display 220, a second support plate 222, and the hinge structure 300a.

The hinge structure 300a may include a first bracket 311, a second bracket 312, a first arm portion 321, a second arm portion 322, a support portion 350, a stopper 360, an elastic member 361, and a screw 362.

The support portion 350 may move in a direction of a rear face of the flexible display 220 by means of a first support rib 321b of the first arm portion 321 and a second support rib 322b of the second arm portion 322, when the electronic device rotates from the folded state to the unfolded state as described above. Through the aforementioned process, the support portion 350 may support one region of the flexible display 220 not supported by the first arm portion 321 and the second arm portion 322, when the electronic device is in the unfolded state, as illustrated in FIG. 10A.

When the electronic device is in the unfolded state, a gap (e.g., g of FIG. 10A) may be constructed between the support portion 350 and/or the first support rib 321b of the first arm portion 321 and the second support rib 322b of the second arm portion 322. When the electronic device is in the unfolded state, as the gap is constructed between the support portion 350 and/or the first support rib 321b and the second support rib 322b, the support portion 350 can be prevented from moving in a direction of the flexible display 220 by at least a specified distance. When the electronic device is in the unfolded state, the gap between the support portion 350 and the first support rib 32b and the second support rib 322b may be constructed to be greater than a gap between a protrusion region (e.g., a fixing region E1 of FIG. 12A) of a shaft bracket 355 or a protrusion region (e.g., a fixing region E2 of FIG. 13A) of the stopper 360 360 and a fixing rib 352 constructed in one region of the support portion 350. As a result, the support portion 350 can be prevented from moving in a duplicate manner in an upper direction (e.g., the +y direction of FIG. 10A) by means of the first support rib 321b and the second support rib 322b. That is, when the electronic device is in the unfolded state, the hinge structure 300a can prevent the flexible display 220 from being damaged by the support portion 350 through the gap constructed between the support portion 350 and/or the first support rib 321b and the second support rib 322b.

The stopper 360 may be located at a lower end (e.g., the −y direction of FIG. 10A) of the support portion 350, and a through-hole 360c may be constructed in one region of the stopper 360. A protrusion region 351 of the support portion 350 may be located at a lower end of the stopper 360 by passing through the through-hole 360c, and the screw 362 may be coupled to the protrusion region 351 of the support portion 350 passing through the through-hole 360c. An outer circumferential surface of one face of the screw 362 facing the protrusion region 351 may be constructed to be greater than an outer circumferential surface of the protrusion region 351, so that the elastic member 361 is disposed between the stopper 360 and the screw 362. The elastic member 361 may be a spring, but is not limited thereto.

One end of the elastic member 361 may be in contact with one region of the stopper 360 (e.g., a neighboring region of the through-hole 360c), and the other end may be in contact with the screw 362 coupled to the protrusion region of the support portion 350. The elastic member 361 may be compressed when the support portion 350 moves in an upper direction (e.g., the +y direction of FIG. 10A), or may be restored to its original state due to elastic restoration force.

As the electronic device rotates from the folded state to the unfolded state, the support portion 350 moves in a direction of the flexible display 220. The screw 362 coupled to the protrusion region 351 may also move in an upper direction (e.g., the +y direction of FIG. 10A) due to the movement of the support portion 350, and the elastic member 361 may be compressed due to the upward movement of the screw 362.

As the electronic device rotates from the unfolded state to the folded state, the first arm portion 321 may rotate counterclockwise (e.g., the direction (of FIG. 10B), and the second arm portion 322 may rotate clockwise (e.g., the direction D of FIG. 10B), so that the first support rib 321*b* and the second support rib 322*b* are spaced apart from the support portion 350. As the first support rib 321*b* and second support rib 322*b* are spaced apart from the support portion 350, pressure may be applied to the screw 362 in a lower direction (e.g., the −y direction of FIG. 10B) due to elastic restoration force of the compressed elastic member 361. Due to the pressure applied to the screw 362, the screw 362 and the support portion 350 coupled with the screw 362 may move in a lower direction (e.g., the −y direction of FIG. 10B). That is, in a process in which the electronic device rotates from the unfolded state to the folded state, the support portion 350 may be spaced apart from the flexible display 220 due to the elastic restoration force of the elastic member 361 located between the stopper 360 and the screw 362.

Through the aforementioned driving process, the support portion 350 may not interrupt a rotation trajectory (or a "driving trajectory") of the flexible display 220 or the first support plate 221 and the second support plate 222 in the process in which the electronic device rotates from the unfolded state to the folded state. On the other hand, when the electronic device is in the unfolded state, the support portion 350 may support one region of the flexible display 220 not supported by the first arm portion 321 and the second arm portion 322, thereby preventing the flexible display 220 from being damaged or sagged.

Figure 11A:
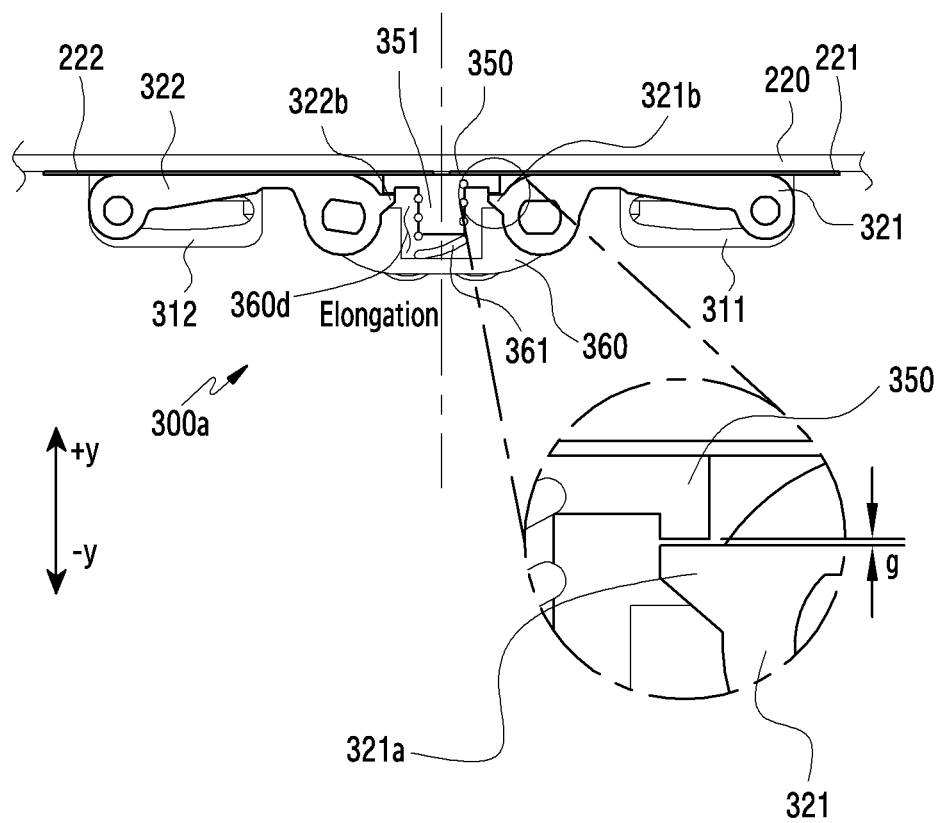
FIG. 11A is a cross-sectional view of a hinge structure when an electronic device is in an unfolded state, according to another embodiment.
Figure 11B:
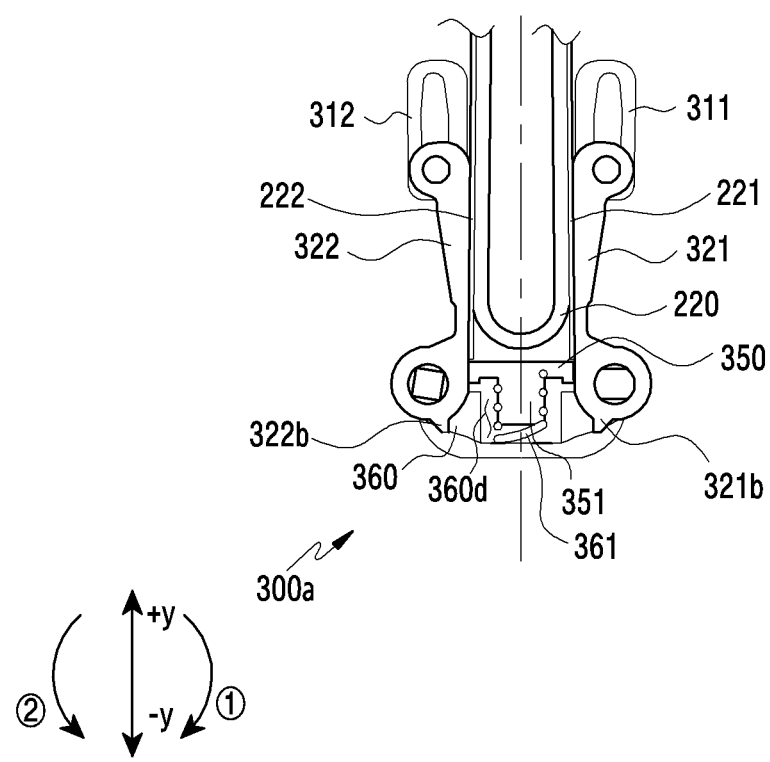
FIG. 11B is a cross-sectional view of a hinge structure when an electronic device is in a folded state, according to an embodiment.

FIG. 11A is a cross-sectional view of a hinge structure when an electronic device is in an unfolded state, according to an embodiment. FIG. 11B is a cross-sectional view of the hinge structure when the electronic device is in a folded state, according to an embodiment. FIG. 11A may illustrate a cross-section of the hinge structure 300*a* of FIG. 6A, cut along the direction A-A', and FIG. 11B may illustrate a cross-section of the hinge structure 300*a* of FIG. 6C, cut along the direction A-A'.

Referring to FIG. 1A and FIG. 11B, an electronic device includes a flexible display 220, a first support plate 221 supporting the flexible display 220, a second support plate 222, and a hinge structure 300*a*.

The hinge structure 300*a* may include a first bracket 311, a second bracket 312, a first arm portion 321, a second arm portion 322, a support portion 350, a stopper 360, and an elastic member 361. At least one component of the hinge structure 300*a* of FIG. 11A and FIG. 11B may be identical or similar to at least one of component of FIG. 10A and FIG. 10B, and redundant descriptions will be omitted hereinafter.

The hinge structure 300*a* may move the support portion 350 in an upper direction (e.g., the +y direction of FIG. 1A) or a lower direction (e.g., the −y direction of FIG. 1A) in a manner that is different from FIG. 11A and FIG. 10B.

The support portion 350 may move in a direction of a rear face of the flexible display 220 by means of a first support rib 321*b* of the first arm portion 321 and a second support rib 322*b* of the second arm portion 322, when the electronic device rotates from the folded state to the unfolded state as described above. Through the aforementioned process, the support portion 350 may support one region of the flexible display 220 not supported by the first arm portion 321 and the second arm portion 322, when the electronic device is in the unfolded state, as illustrated in FIG. 1A.

When the electronic device is in the unfolded state, a gap (e.g., g of FIG. 11A) may be constructed between the support portion 350 and/or the first support rib 321*b* of the first arm portion 321 and the second support rib 322*b* of the second arm portion 322. When the electronic device is in the unfolded state, as the gap is constructed between the support portion 350 and/or the first support rib 321*b* and the second support rib 322*b*, the support portion 350 can be prevented from moving in a direction of the flexible display 220 by at least a specified distance. When the electronic device is in the unfolded state, the gap between the support portion 350 and/or the first support rib 32*b* and the second support rib 322*b* may be constructed to be greater than a gap between a protrusion region (e.g., the fixing region E1 of FIG. 12A) of the shaft bracket 355 or a protrusion region (e.g., the fixing region E2 of FIG. 13A) of the stopper 360 and a fixing rib 352 constructed in one region of the support portion 350. As a result, the support portion 350 can be prevented from moving in a duplicate manner in an upper direction (e.g., the +y direction of FIG. 11A) by means of the first support rib 321*b* and the second support rib 322*b*. That is, when the electronic device is in the unfolded state, the hinge structure 300*a* can prevent the flexible display 220 from being damaged by the support portion 350 through the gap constructed between the support portion 350 and the first support rib 321*b* and the second support rib 322*b*.

The stopper 360 may be located at a lower end (or a rear face) of the support portion 350, and a groove 360*d* may be constructed in at least one region of the stopper 360. An inner space may be constructed in the stopper 360 due to the groove 360*d* constructed at the stopper 360, and a protrusion region 351 of the support portion 350 may be located inside the space.

The elastic member 361 may be a spring, and may be located inside the inner space of the stopper 360 constructed by the groove 360*d*. One end of the elastic member 361 may be coupled to one region of the support portion 350, and the other end of the elastic member 361 may be coupled to one region of the inner space of the stopper 360. The elastic member 361 may be attached to one region of the support portion 350 and/or one region of the inner space of the stopper 360 by an adhesive. The elastic member 361 may be coupled to one region of the support portion 350 and stopper 360 through a fixing member located in one region of the support portion 350 and/or one region of the inner space of the stopper 360. The protrusion region 351 of the support portion 350 may be partially inserted into the elastic member 361 to guide a direction of a motion (e.g., compression or elongation) of the elastic member 361.

According to an embodiment, as the electronic device rotates from the folded state to the unfolded state, the support portion 350 moves in a direction of the flexible display 220 by means of the first support rib 321*b* and the second support rib 322*b*. The elastic member 361 coupled to one region of the support portion 350 and one region of the stopper 360 is elongated due to the upward movement of the support portion 350.

As the electronic device rotates from the unfolded state to the folded state, the first arm portion 321 may rotate counterclockwise (e.g., the direction U of FIG. 11B), and the second arm portion 322 may rotate clockwise (e.g., the direction D of FIG. 11B), so that the first support rib 321*b* and the second support rib 322*b* are spaced apart from the support portion 350. As the first support rib 321*b* and the second support rib 322*b* are spaced apart from the support portion 350, the support portion 350 may move in a lower direction (e.g., the −y direction of FIG. 11B) due to the elastic restoration force of the elastic member 361, thereby being spaced apart from the flexible display 220.

That is, when the electronic device is in the unfolded state, the support portion 350 may support one region of the flexible display 220 not supported by the first arm portion 321 and the second arm portion 322, thereby preventing the flexible display 220 from being damaged or sagged. On the other hand, in a process in which the electronic device rotates from the unfolded state to the folded state, the support portion 350 may be spaced apart from the flexible display 220 due to the elastic restoration force of the elastic member 361. Accordingly, the support portion 350 may not interrupt a rotation trajectory ("driving trajectory") of the flexible display 220 or the first support plate 221 and the second support plate 222.

Figure 12A:
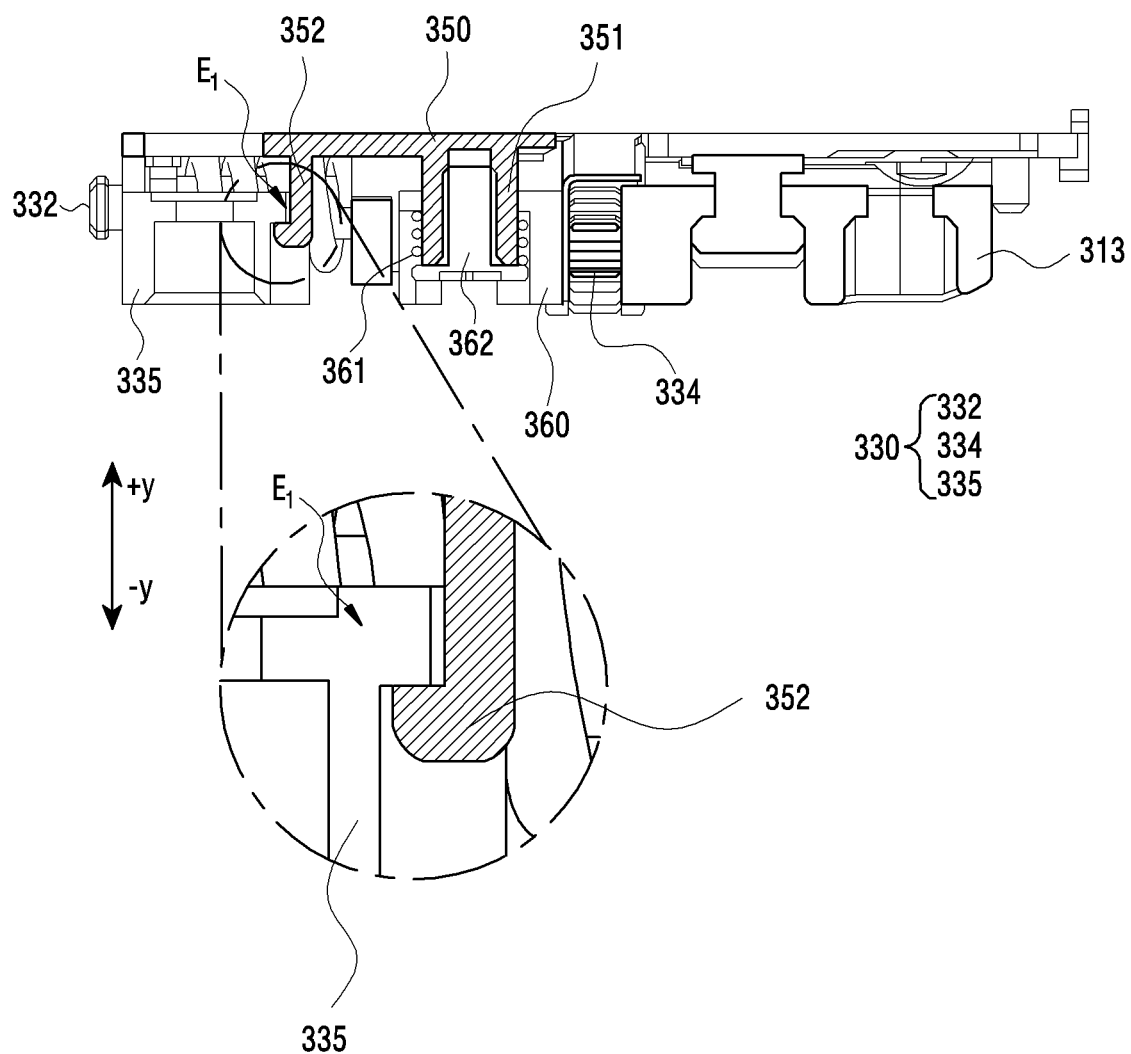
FIG. 12A is a cross-sectional view of a hinge structure when an electronic device is in an unfolded state, according to an embodiment.
Figure 12B:
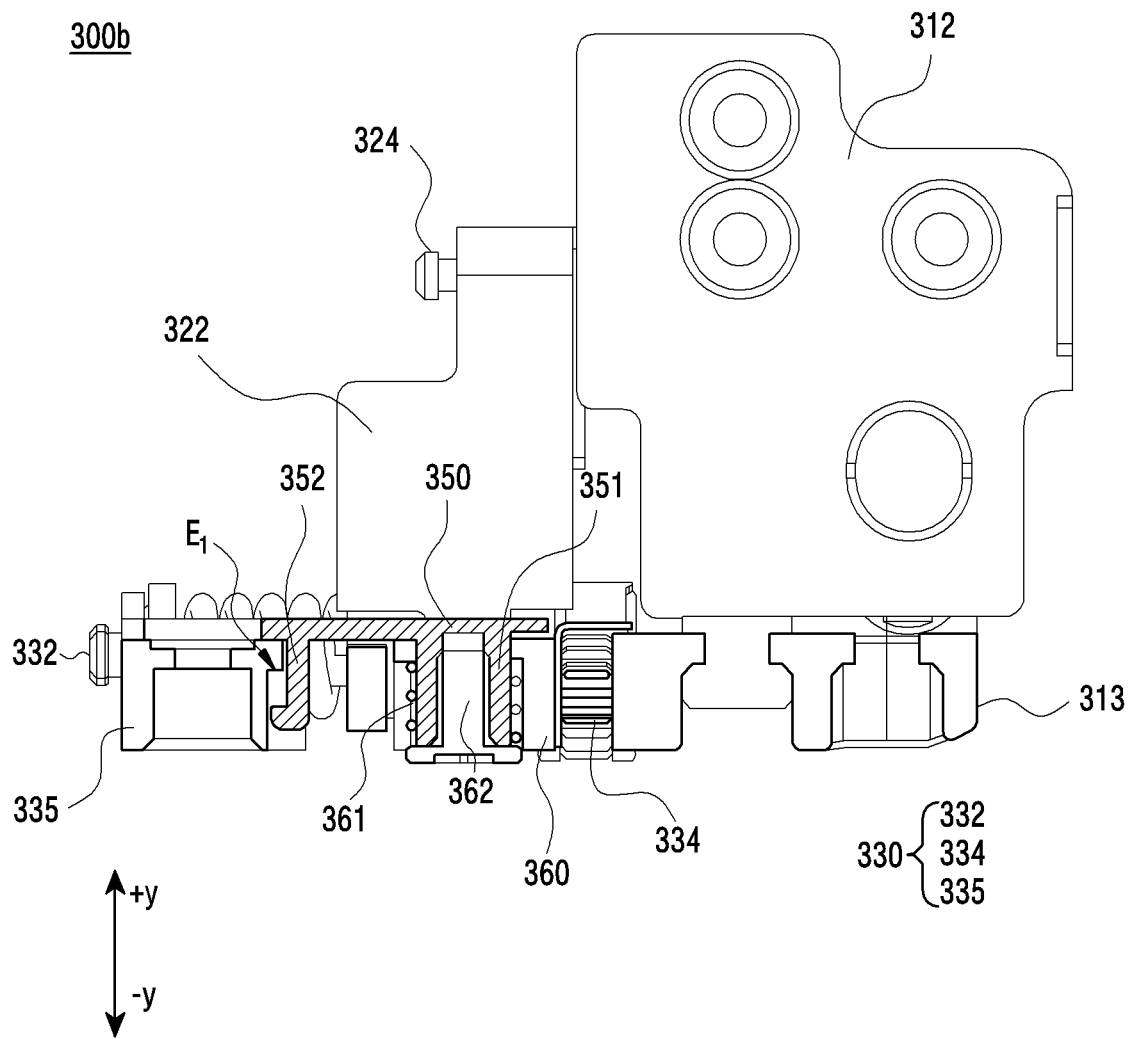
FIG. 12B is a cross-sectional view of a hinge structure when an electronic device is in a folded state, according to an embodiment.

FIG. 12A is a cross-sectional view of a hinge structure when an electronic device is in an unfolded state, according to an embodiment. FIG. 12B is a cross-sectional view of the hinge structure when the electronic device is in a folded state, according to an embodiment. FIG. 12A may illustrate a cross-section of the hinge structure 300a of FIG. 6A, cut along the direction B-B', and FIG. 12B may illustrate a cross-section of the hinge structure 300a of FIG. 6C, cut along the direction B-B'.

Referring to FIG. 12A and FIG. 12B, a hinge structure 300b of an electronic device includes a second bracket 312, a fixing bracket 313, a second arm portion 322, a second fixing portion 324 coupling the second bracket 312 and the second arm portion 322, a rotation structure 330 including a second shaft 332, a second idle gear 334, and a shaft bracket 335, a support portion 350, a stopper 360, an elastic member 361, and a screw 362. At least one component of the hinge structure 300b of FIG. 12A and FIG. 12B may be identical or similar to at least one component of FIG. 5, FIG. 10A and FIG. 10B, and redundant descriptions will be omitted hereinafter.

The support portion 350 may be located on the stopper 360, and may include a protrusion region 351 and a fixing rib 352. The protrusion region 351 may be constructed to protrude in a lower direction (e.g., the −y direction of FIG. 12A) of the support portion 350, and may be coupled with the screw 362 as described above to compress the elastic member 361 in a process in which the electronic device rotates from the folded state to the unfolded state. The fixing rib 352 may be constructed to protrude in a lower direction of the support portion 350 similarly to the protrusion region 351, and in a lateral view, may be constructed in a hook shape curved in a direction of the shaft bracket 335.

The fixing rib 352 may be fixed to one region of the shaft bracket 335 to prevent the support portion 350 from moving by at least a specified distance in an upper direction (e.g., the +y direction of FIG. 12A) or in a direction of a flexible display (e.g., the flexible display 220 of FIG. 2A) in the process in which the electronic device rotates from the folded state to the unfolded state.

The shaft bracket 335 may include a fixing region E1. The fixing region E1 may be constructed to protrude in a direction of the stopper 360 from one region of the shaft bracket 335. As the electronic device rotates from the folded state (e.g., see FIG. 12B) to the unfolded state (e.g., see FIG. 12A), the support portion 350 may move in an upper direction, and the fixing rib 352 of the support portion 350 may be in contact with the fixing region E1 of the shaft bracket 335 due to the upward movement of the support portion 350.

When the electronic device is in the unfolded state, the hook-shaped fixing rib 352 may be in contact with a lower region of the fixing region E1 so that the fixing rib 352 of the support portion 350 is caught at the fixing region E1 of the shaft bracket 335. When the support portion 350 moves in an upper direction by at least a specified distance, pressure may be applied in the upper direction to the flexible display disposed to an upper end of the support portion 350, and some regions of the flexible display may be damaged due to the pressure applied by the support portion 350. When the electronic device is in the unfolded state, the fixing rib 352 of the support portion 350 may be disposed to be in contact with the fixing region E1 of the shaft bracket 335 without a gap, so that the support portion 350 can be prevented from moving in the upper direction by at least a specified distance.

When the electronic device rotates from the unfolded state to the folded state, the support portion 350 may move in a lower direction (e.g., the −y direction of FIG. 12B) due to elastic restoration force of the elastic member 361 as described above. Accordingly, the fixing rib 352 may be spaced apart from the fixing region E1 of the shaft bracket 335. As the fixing rib 352 is spaced apart from the fixing region E1 of the shaft bracket 335, the support portion 350 may move in a lower direction without being affected by the fixing region E1.

That is, the hinge structure 300b may control the movement of the support portion 350 so that the support portion 350 moves in an upper direction within a specified range through the fixing rib 352 of the support portion 350 and the fixing region E1 of the shaft bracket 335.

Figure 13A:
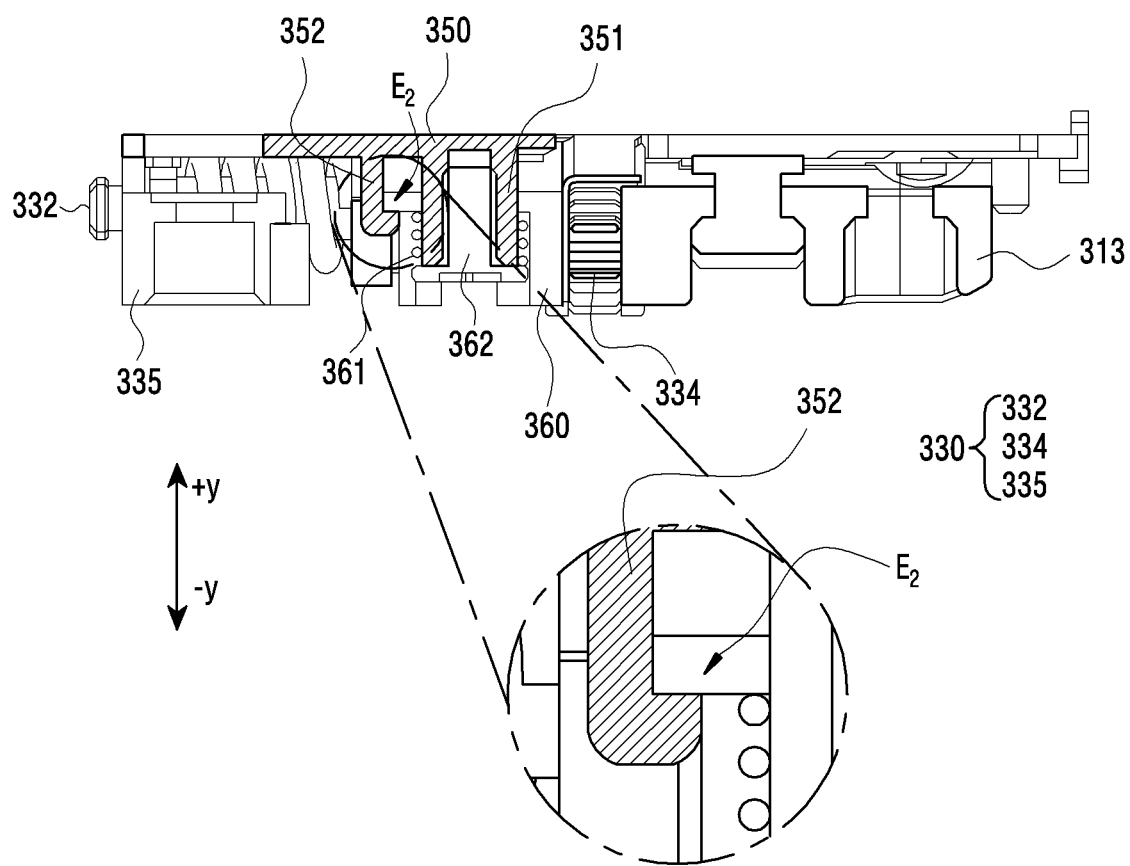
FIG. 13A is a cross-sectional view of a hinge structure when an electronic device is in an unfolded state, according to another embodiment.
Figure 13B:
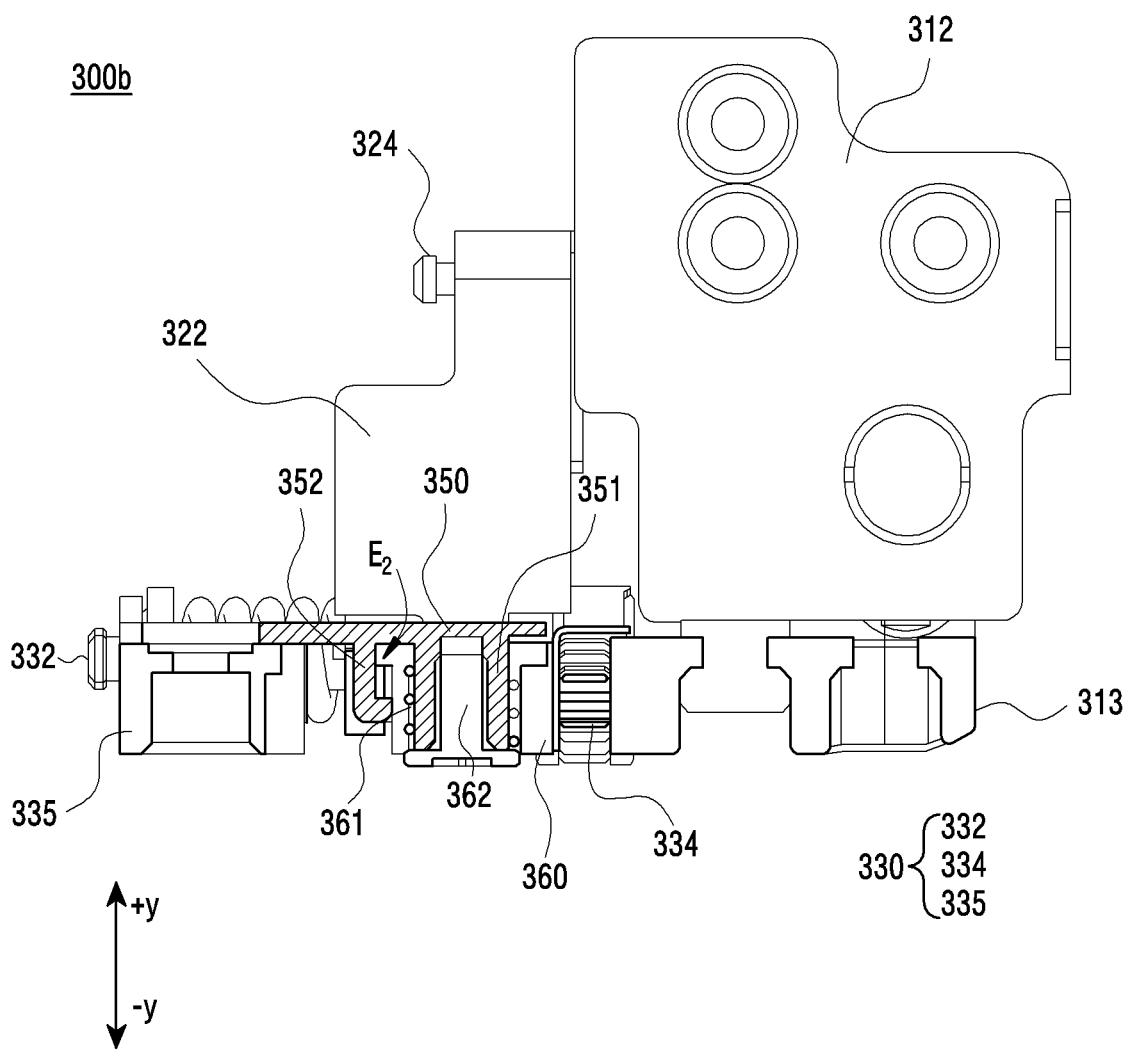
FIG. 13B is a cross-sectional view of a hinge structure when an electronic device is in a folded state according to another embodiment.

FIG. 13A is a cross-sectional view of a hinge structure when an electronic device is in an unfolded state, according to another embodiment. FIG. 13B is a cross-sectional view of the hinge structure when the electronic device is in a folded state, according to an embodiment. FIG. 13A may illustrate a cross-section of the hinge structure 300a of FIG. 6A, cut along the direction B-B', and FIG. 13B may illustrate a cross-section of the hinge structure 300a of FIG. 6C, cut along the direction B-B'.

Referring to FIG. 13A and FIG. 13B, a hinge structure 300b of an electronic device includes a second bracket 312, a fixing bracket 313, a second arm portion 322, a second fixing portion 324 coupling the second bracket 312 and the second arm portion 322, a rotation structure 330 including a second shaft 332 and a second idle gear 334, a support portion 350, a stopper 360, an elastic member 361, and a screw 362.

The hinge structure 300b of FIG. 13A and FIG. 13B can prevent the support portion 350 from moving in an upper direction (e.g., the +y direction of FIG. 13A) in a manner different from the manner in FIG. 12A and FIG. 12B. At least one component of the hinge structure 300b of FIG. 13A and FIG. 13 may be identical or similar to at least one component of FIG. 10A and FIG. 10B, and redundant descriptions will be omitted hereinafter.

The support portion 350 may be located on the stopper 360, and may include a protrusion region 351 and a fixing rib 352. The protrusion region 351 may be constructed to protrude in a lower direction (e.g., the −y direction of FIG. 13A) of the support portion 350, and may be coupled with the screw 362 to compress the elastic member 361 in a process in which the electronic device rotates from the folded state to the unfolded state. The fixing rib 352 may be constructed to protrude in a lower direction of the support portion 350, and in a lateral view, may be constructed in a hook shape curved in a direction of the stopper 360.

The fixing rib 352 may be fixed to one region of the stopper 360 to prevent the support portion 350 from moving by at least a specified distance in an upper direction (e.g., the +y direction of FIG. 13A) or in a direction of a flexible display 220 in the process in which the electronic device rotates from the folded state to the unfolded state.

The stopper 360 may include a fixing region E2. The fixing region E2 may be constructed to protrude in a direction of the shaft bracket 335 from one region of the stopper 360. As the electronic device rotates from the folded state, as illustrated in FIG. 13B, to the unfolded state, as illustrated in FIG. 13A, the support portion 350 may move in an upper direction, and the fixing rib 352 of the support portion 350 may be in contact with the fixing region E2 of the stopper 360 due to the upward movement of the support portion 350.

When the electronic device is in the unfolded state, the hook-shaped fixing rib 352 may be in contact with a lower end of the fixing region E2 of the stopper 360 so that the fixing rib 352 of the support portion 350 is caught at the fixing region E2. When the support portion 350 moves in an upper direction by at least a specified distance, some regions of the flexible display may be damaged due to the pressure applied by the support portion 350. When the electronic device is in the unfolded state, the fixing rib 352 of the support portion 350 may be disposed to be in contact with the fixing region E2 of the stopper 360, so that the support portion 350 can be prevented from moving in the upper direction by at least a specified distance.

Additionally or alternatively, when the electronic device rotates from the unfolded state to the folded state, the support portion 350 may move in a lower direction (e.g., the −y direction of FIG. 13B) due to elastic restoration force of the elastic member 361 as described above. Due to the movement of the support portion 350, the fixing rib 352 may be spaced apart from the fixing region E2 of the stopper 360. As the fixing rib 352 is spaced apart from the fixing region E2 of the stopper 360, the support portion 350 may move in a lower direction without being affected by the fixing region E2.

That is, unlike FIG. 12A and FIG. 12B, the hinge structure 300b of FIG. 13A and FIG. 13B may control the movement of the support portion 350 so that the support portion 350 moves in an upper direction within a specified range through the fixing rib 352 of the support portion 350 and the fixing region E2 of the stopper 360.

According to an embodiment, an electronic device may include a first housing, a second housing, a hinge assembly coupling the first housing and the second housing so that the second housing is rotatable with respect to the first housing, and a flexible display disposed from one region of the first housing to at least one region of the second housing across the hinge assembly. The hinge assembly may include a first bracket coupled to at least one region of the first housing to rotate about a virtual first rotation axis, a second bracket coupled to at least one region of the second housing to rotate about a virtual second rotation axis, a fixing bracket supporting the first bracket and the second bracket, a first shaft rotating about a third rotation axis different from the virtual first rotation axis, a second shaft adjacent to the first shaft to rotate about a fourth rotation axis different from the virtual second rotation axis, a first arm portion coupled to the first shaft to rotate about the third rotation axis, and having one side coupled to at least one region of the first bracket, a second arm portion coupled to the second shaft to rotate about the fourth rotation axis, and having one side coupled to at least one region of the second bracket, and a support portion located between the first arm portion and the second arm portion. The support portion may support at least one region of the flexible display when the electronic device is in an unfolded state, and may be spaced apart from the flexible display as the electronic device rotates from the unfolded state to a folded state.

The first arm portion may include a first support rib supporting at least one region of the support portion when the electronic device is in the folded state. The second arm portion may include a second support rib supporting at least one region of the support portion when the electronic device is in the folded state.

The first support rib and the second support rib may move the support portion in a direction of the flexible display, as the electronic device rotates from the folded state to the unfolded state.

The electronic device may further include a first auxiliary member coupled to the first shaft to rotate about the third rotation axis, and including a third support rib, and a second auxiliary member coupled to the second shaft to rotate about the fourth rotation axis, and including a fourth support rib.

The electronic device may further include a stopper having a through-hole through which a protrusion region of the support portion passes, a screw coupled to the protrusion region of the support portion, and an elastic member located between the stopper and the screw and in contact with at least one region of the stopper.

The elastic member may be compressed, as the electronic device rotates from the folded state to the unfolded state.

The support portion may be spaced apart from the flexible display due to restoration force of the elastic member, as the electronic device rotates from the unfolded state to the folded state.

The electronic device may further include a stopper located at a lower end of the support portion and having a groove constructed in at least one region, and an elastic member located inside the groove and having one side fixed to at least one region of the support portion and another side fixed to at least one region of the stopper.

The elastic member may be elongated in a direction of the flexible display as the electronic device rotates from the folded state to the unfolded state.

The support portion may further include a fixing rib constructed to protrude in a lower direction of the support portion.

The electronic device may include a shaft bracket supporting the first shaft and the second shaft. The fixing rib may be in contact with one region of the stopper or one region of the shaft bracket as the electronic device rotates from the folded state to the unfolded state, so that the support portion is prevented from moving by more than a specified height.

The electronic device may further include a detent plate including a detent portion of a concavo-convex structure constructed to protrude in a direction of the first arm portion and second arm portion.

A first cam portion corresponding to the detent portion may be constructed in one region of the first arm portion. A second cam portion corresponding to the detent portion may be constructed in one region of the second arm portion.

The electronic device may further include a first gear coupled to the first shaft, a second gear coupled to the second shaft, a first idle gear engaged with the first gear, and a second idle gear engaged with the first idle gear and the second gear.

A first slide hole may be constructed in one region of the first bracket corresponding to the first arm portion. A second slide hole may be constructed in one region of the second bracket corresponding to the second arm portion.

The first bracket and the first arm portion may be coupled through a first fixing portion which passes through the first slide hole and one region of first arm portion. The second bracket and the second arm portion may be coupled through a second fixing portion which passes through the second slide hole and one region of second arm portion.

The first fixing portion may be slid from an outer region to inner region of the first slide hole, as the electronic device rotates from the unfolded state to the folded state. The second fixing portion may be slid from the outer region to inner of the second slide hole as the electronic device rotates from the unfolded state to the folded state.

According to an embodiment, a hinge assembly may include a hinge housing, and at least one hinge structure disposed inside the hinge housing. The at least one hinge structure may include a first bracket rotating about a virtual first rotation axis, a second bracket adjacent to the first bracket and rotating about a virtual second rotation axis different from the virtual first rotation axis, a fixing bracket supporting the first bracket and the second bracket, a first shaft rotating about a third rotation axis different from the virtual first rotation axis, and having a first gear coupled thereto, a second shaft adjacent to the first shaft to rotate about a fourth rotation axis different from the virtual second rotation axis, and having a second gear coupled thereto, a shaft bracket supporting the first shaft and the second shaft, a first idle gear gear-coupled with the first gear, a second idle gear gear-coupled with the first idle gear and the second gear, a first arm portion coupled to the first shaft to rotate about the third rotation axis, and having one side coupled to at least one region of the first bracket, a second arm portion coupled to the second shaft to rotate about the fourth rotation axis, and having one side coupled to at least one region of the second bracket, and a support portion moving up and down with the rotation of the first arm portion and second arm portion.

The first arm portion may include a first support rib supporting at least one region of the support portion when the first arm portion and the second arm portion are in a horizontal state. The second arm portion may include a second support rib supporting at least one region of the support portion when the first arm portion and the second arm portion are in the horizontal state. The hinge assembly may further include a stopper having a through-hole through which a protrusion region of the support portion passes, a screw coupled to the protrusion region of the support portion, and an elastic member located between the stopper and the screw and in contact with at least one region of the stopper.

According to an embodiment, an electronic device can reduce a size of a hinge assembly by integrating various structures for rotating a housing.

According to an embodiment, an electronic device can support a flexible display even when the electronic device is in an unfolded state without affecting a driving trajectory of the flexible display.

According to an embodiment, an electronic device can prevent a flexible display from being damaged in a process of using the electronic device, and can the flexible display to be more flat than traditional flexible displays.

In the aforementioned specific embodiments of the present disclosure, components included in the disclosure are expressed in singular or plural forms according to the specific embodiments disclosed herein. However, the singular or plural forms (i.e., terms and/or expressions) are selected for a situation disclosed for the convenience of explanation, and thus various embodiments of the disclosure are not limited to a single or a plurality of components. Therefore, a component expressed in a plural form can also be expressed in a singular form, or vice versa.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A foldable device comprising:
   a housing including a first housing and a second housing;
   a hinge structure coupled with the first housing and the second housing and accommodated in a hinge housing; and
   a flexible display accommodated in the first housing and the second housing;
   wherein the hinge structure includes:
   a first bracket coupled with the first housing and configured to rotate about a first axis;
   a second bracket coupled with the second housing and configured to rotate about a second axis;
   a first support member coupled with the first bracket, and including a first support rib protruding from one region of the first support member;
   a second support member coupled with the second bracket and including a second support rib protruding from one region of the second support member;
   a third support member at least partially disposed between the first support member and the second support member; and
   a stopper;
   and
   an elastic member, wherein the elastic member is in contact with one region of the stopper and is arranged such that the elastic member is deformed while the third support member is moved in a first direction opposite to the hinge housing by the first support rib of the first support member and the second support rib of the second support member, while the foldable device is being changed from a folded state to an unfolded state,
   wherein the third support member is configured to support at least one region of the flexible display when the foldable device is in the unfolded state, and
   wherein the third support member is moved in a second direction opposite to the first direction by the elastic restoration force of the elastic member, while the foldable device is being changed from the unfolded state to the folded state.

2. The foldable device of claim 1, wherein the third support member includes a protrusion region and a fixing rib, the fixing rib of the third support member being configured to prevent the third support member from moving by at least a specific distance in a direction of the flexible display in the process in which the electronic device is unfolded from the folded state to the unfolded state.

3. The foldable device of claim 1, wherein the first support member supports a first portion of the third support member when the foldable device is in the unfolded state and the second support member supports a second portion of the third support member when the foldable device is in the unfolded state.

4. The foldable device of claim 1, wherein the stopper includes a through-hole, and at least portion of a protrusion region of the third support member is inserted in the second direction of the stopper by passing through the through-hole.

5. The foldable device of claim 4, wherein the hinge structure further comprises a screw coupled to a protrusion region of the third support member, wherein the screw is inserted to a lower end of the protrusion region of the third support member.

6. The foldable device of claim 4, wherein one end of the elastic member is in contact with a neighboring region of the through-hole of the stopper.

7. The foldable device of claim 6, wherein the other end of the elastic member is in contact with the screw.

8. The foldable device of claim 5, wherein the elastic member is configured to be disposed between the stopper and the screw.

9. The foldable device of claim 1, wherein the elastic member is a spring.

10. The foldable device of claim 1, wherein the first support rib of the first support member and the second support rib of the second support member are in contact with the third support member, when the foldable device is in the unfolded state.

11. The foldable device of claim 10, wherein the first support rib and the second support rib are spaced apart from the third support member, while the foldable device is being folded.

12. The foldable device of claim 1, wherein the stopper is located at a lower end of the third support member.

13. A hinge assembly comprising:
- a first bracket configured to rotate about a first axis;
- a second bracket configured to rotate about a second axis;
- a first support member including a first support rib;
- a second support member including a second support rib;
- a third support member at least partially disposed between the first support member and the second support member;
- a stopper surrounding a portion of the third support member; and
- an elastic member coupled with the stopper and applying an elastic force to move the third support member,
- wherein the third support member moves in a first direction by the first support rib of the first support member and the second support rib of the second support member, while the hinge assembly is being unfolded, and
- wherein the third support member is moved in a second direction opposite to the first direction by the elastic force of the elastic member, while the hinge assembly is being folded.

14. The hinge assembly of claim 13, wherein the first support member supports a first portion of the third support member when the hinge assembly is in the unfolded state and the second support member supports a second portion of the third support member when the hinge assembly is in the unfolded state.

15. The hinge assembly of claim 13, wherein at least a portion of a protrusion region of the third support member is surrounded by the stopper.

16. The hinge assembly of claim 13, wherein the elastic member is a spring.

17. The hinge assembly of claim 13, wherein the elastic member is in contact with a portion of the stopper.

* * * * *